(12) United States Patent
Ferland et al.

(10) Patent No.: US 10,597,948 B2
(45) Date of Patent: Mar. 24, 2020

(54) MOBILE BOOM SYSTEM

(71) Applicant: Helmerich & Payne, Inc., Tulsa, OK (US)

(72) Inventors: Joel Ferland, Bixby, OK (US); Bernard Cook, Tulsa, OK (US); DeWayne Speer, Tulsa, OK (US); Robert Lee Stauder, Broken Arrow, OK (US); Anthony James Evans, Tulsa, OK (US); Gary Don Davis, Rush Springs, OK (US); Patrick L. Gustafson, Owasso, OK (US); Victor Arthur Garcia, Grand Junction, CO (US)

(73) Assignee: Helmerich & Payne, Inc., Tulsa, OK (US)

( * ) Notice: Subject to any disclaimer, the term of this patent is extended or adjusted under 35 U.S.C. 154(b) by 0 days.

(21) Appl. No.: 16/268,125

(22) Filed: Feb. 5, 2019

(65) Prior Publication Data
US 2019/0169940 A1    Jun. 6, 2019

Related U.S. Application Data

(63) Continuation of application No. 15/842,415, filed on Dec. 14, 2017, now Pat. No. 10,280,693.

(Continued)

(51) Int. Cl.
*E21B 15/00* (2006.01)
*F16L 3/015* (2006.01)
(Continued)

(52) U.S. Cl.
CPC .............. *E21B 15/003* (2013.01); *E21B 7/02* (2013.01); *E21B 41/00* (2013.01); *F16L 3/015* (2013.01)

(58) Field of Classification Search
CPC combination set(s) only.
See application file for complete search history.

(56) References Cited

U.S. PATENT DOCUMENTS

| 2,754,087 A | 7/1956 | Johnson |
| 3,439,700 A | 4/1969 | Preston |

(Continued)

FOREIGN PATENT DOCUMENTS

| EP | 0744526 | 11/1996 |
| GB | 2177738 | 1/1987 |
| WO | 004097162 A1 | 11/2004 |

OTHER PUBLICATIONS

ISR and Written Opinion/PCT/US2017/066425, dated Mar. 6, 2018.

*Primary Examiner* — Kyle Armstrong
(74) *Attorney, Agent, or Firm* — Vinson & Elkins L.L.P.

(57) ABSTRACT

A boom system for transporting and deployment of utility service lines (such as cables, wires, hoses, pipes, etc.) from sources of the services to a drilling rig. The mobile boom system includes a mobile skid with posts located at opposite ends of the skid, and one or more articulating booms pivotally attached to each skid post. One or more articulating booms attached to a post at the first end of the skid can support and carry the service lines connected to the sources and one or more articulating booms attached to a post at the second end of the skid can support and carry the service lines connected to a drilling rig, or to an articulating boom extending from a drilling rig. The mobile articulating boom system can include means for moving and selectively positioning the mobile articulating boom system at a drilling site.

25 Claims, 18 Drawing Sheets

Related U.S. Application Data

(60) Provisional application No. 62/434,088, filed on Dec. 14, 2016.

(51) Int. Cl.
*E21B 7/02* (2006.01)
*E21B 41/00* (2006.01)

(56) References Cited

U.S. PATENT DOCUMENTS

| | | | |
|---|---|---|---|
| 3,464,507 A * | 9/1969 | Smith | E21B 19/155 |
| | | | 175/85 |
| RE29,526 E | 1/1978 | Jeter | |
| 4,646,875 A | 3/1987 | Sholl | |
| 5,113,953 A | 5/1992 | Noble | |
| 5,265,682 A | 11/1993 | Russell et al. | |
| 5,617,926 A | 4/1997 | Eddison et al. | |
| 5,875,859 A | 3/1999 | Ikeda et al. | |
| 5,979,570 A | 11/1999 | McLoughlin et al. | |
| 6,092,610 A | 7/2000 | Kosmala et al. | |
| 6,244,361 B1 | 6/2001 | Comeau et al. | |
| 6,600,665 B2 | 7/2003 | Lauchner | |
| 6,902,069 B2 | 6/2005 | Harman et al. | |
| 7,819,207 B2 | 10/2010 | Cowan | |
| 9,151,412 B2 | 10/2015 | Trevithick et al. | |
| 9,353,601 B2 | 5/2016 | Hause | |
| 9,360,134 B2 | 6/2016 | Orgeron et al. | |
| 9,617,796 B2 * | 4/2017 | Hall | E21B 15/00 |
| 2011/0132485 A1 | 6/2011 | Garceau | |
| 2013/0012714 A1 | 1/2013 | Reguri et al. | |
| 2013/0270399 A1 | 10/2013 | Berkowitz et al. | |
| 2014/0150232 A1 | 6/2014 | Arthur | |
| 2015/0096952 A1 | 4/2015 | Hall et al. | |
| 2015/0315861 A1 | 11/2015 | Stimline | |

\* cited by examiner

MOBILE BOOM SYSTEM

CROSS REFERENCE TO RELATED APPLICATIONS

This application is a continuation of and claims priority to and the benefit of U.S. patent application Ser. No. 15/842,415, filed Dec. 14, 2017, and also claims benefit of priority to U.S. Provisional Application No. 62/434,088, filed Dec. 14, 2016, the entire disclosures of each are incorporated herein by reference for all purposes.

FIELD OF THE INVENTION

The invention relates to apparatus, systems and methods useful in pad drilling and other drilling operations, and more particularly to apparatus, systems, and methods useful in connection with the movement and operation of mobile drilling equipment to minimize the difficulties and time associated with the same.

BACKGROUND OF THE INVENTION

Drilling rigs and related equipment have used booms to carry water and electrical lines. For example, U.S. Pat. No. 7,819,207, issued to Cowan on Oct. 26, 2010, and titled "Mobile Land Drilling Rig and Method of Installation," which is hereby incorporated by reference as if fully set forth herein, describes a mobile drilling rig and relating drilling equipment. Among other things, the use of a utility swing arm is described for carrying water and electrical lines above ground as a safer alternative to the previous approach of running utility lines on the ground in the area of the drilling site.

Pad drilling is a term generally used to describe drilling operations when a drilling rig is moved from one borehole to another on a single drilling pad, such as is common in certain oil and gas drilling operations. When the drilling rig moves to another wellbore within the confines of the same drilling pad, however, it is helpful if only the rig itself needs to be moved, as opposed to all of the supporting equipment, such as power sources, fluid sources, and the like. The power, fluid, and other requirements for a rig's operation are utilities for the rig, and can be provided by a combination of cables, wires, pipes, etc. Towards achieving this goal, it is possible to use one or more "booms" to carry cabling and the like from a source location to a skid post to which a boom is attached, and from the same skid post via a second boom attached to the skid post to the rig, such as is disclosed in U.S. Pat. No. 9,360,134 B2, which issued to Orgeron et al. on Jun. 7, 2016, and is entitled "Service Line Transport and Deployment System," the entire contents of which are hereby incorporated by reference herein as if fully set forth herein.

In addition to the Cowan and Orgeron et al. patents noted above, there have been a number of different approaches generally directed to supporting, managing, and/or handling cables, piping, hoses, wires, and/or the like in a variety of different intended applications, including those set forth in U.S. Pat. No. 3,439,700, 6,600,665, 6,902,069, 9,151,412, and 9,353,601, and in U.S. Published Patent Application No. 2011/0132485 A1, U.S. Published Patent Application No. 2012/0012714 A1, U.S. Published Patent Application No. 2013/0270399 A1, and U.S. Published Patent Application No. 2015/0096952 A1, each of which is hereby incorporated by reference as if fully set forth herein.

SUMMARY OF THE INVENTION

The present disclosure provides a number of advantages over conventional boom systems in transporting and deployment of service lines from stationary sources of the services to a drilling rig. These services that are supplied to the drilling rig via piping or cables, for example, include but are not limited to electrical, hydraulic, pneumatic, and communication services. The present disclosure provides a mobile skid with posts located at opposite ends of the skid, and one or more booms pivotally attached to each skid post. The disclosed mobile skid can thus provide an additional extension to the range of the service lines, such as cabling and piping can be run underneath the booms and on or above the top surface of the skid, underneath the skid, or within a bottom frame of the skid to connect a boom at a first location, such as one end of the skid that is disposed toward the service sources, for example, to a boom at a second location, such as the other end, which is disposed toward the drilling rig. In one embodiment, for example, the cabling and piping is held in a rack horizontally mounted on or above the deck of the skid base. The skid further is adapted to provide the booms in a first, undeployed position, in which the booms fit within the substantially rectangular space above the skid, which makes transportation of the boom system easier and quicker. In a second, deployed position, the booms can extend from the skid, with one set of a plurality of booms extending from one skid post to a source location, and the second set of a plurality of booms extending from the second skid post to a rig location.

In one embodiment of the present disclosure, the mobile skid is further equipped with a plurality of hydraulically actuated feet or pads, together with a control system, allowing an operator to selectively actuate the hydraulic feet and thereby cause the skid to "walk" and move from a first location to a second location. With repeated iterations, the skid can then be selectively positioned with respect to the rig and the source location, thereby allowing greater flexibility of operation. For example, the operator can selectively move the position of the skid around a drilling site to avoid any natural or man-made obstacles, and by moving the skid can achieve a greater range of movement of the rig relative to the source location. Moreover, the control system in one embodiment can be remotely operated by an operator at a distance remote from the skid (such as for extra safety measures), with the operator using a controller, and such controller can be connected either wirelessly or by an extended wire tether or the like to the control system for the skid and the hydraulic actuators. In still other embodiments, the skid may have a plurality of wheels which are moved by motors connected thereto, or the skid may have a plurality of treads or tracks, such as continuous band of linked tread plates which can be driven by motors connected thereto. In yet other embodiments, the skid is provided with a plurality of air bearings to provide an air cushion to allow easy movement of the rig. Still another embodiment includes a plurality of rollers or skid plates to allow easy movement of the skid along the ground.

In another embodiment of the present disclosure, the rig itself can have a rig boom removably and/or pivotally connected thereto. In this particular embodiment, the rig boom can be positioned at angles from the rig of at least +45 degrees to −45 degrees with respect to a line perpendicular to the side of the rig structure. This feature allows the entire rig to rotate and move around the drilling site more than would be possible with a boom arm attached directly to the rig. In addition, in this embodiment the rig boom can have one or more junction boxes located at its end distal the rig, so that the cabling and piping carried by the boom from the skid can be plugged into receptacles located in the junction boxes, thus making it easier and quicker to connect the piping and cabling from the source and via the skid and booms to the rig itself.

In yet another embodiment of the present disclosure, a method of providing utilities to a drilling rig is provided, which comprises providing a movable skid having a longitudinal axis, a first end with a first post proximal thereto, a second end with a second post proximal thereto, means for supporting service lines such as cabling or piping or a combination thereof located between the first post and the second post, and having means for selectively moving the skid, providing a first boom swingably attached to the first post, providing a second boom swingably attached to the second post, wherein each of the first boom and the second boom are adapted to support a plurality of cabling or piping or a combination thereof, and selectively moving at least the skid with the means for selectively moving the skid. The method can also include the step of moving at least either the first boom or the second boom, or both of them. In one embodiment, the means for selectively moving the skid comprise a plurality of hydraulically actuated skid pads. The methods of the disclosure may also include the step of selectively moving the skid further comprises the steps of moving the skid in both a first direction and in a second direction, reorienting the direction of a longitudinal axis the skid relative to a drilling rig, selectively moving the location and/or orientation of the skid in response to movement of a drilling rig, and/or moving at least one of the first boom and the second boom.

In other embodiments of the present disclosure, a rack or modular handling system is provided for removably holding and securing cabling, piping and other service lines to a boom. The modular handling system may include a plurality of connecting brackets to hold the system together and to attach the system to the boom. In addition, the system may include a plurality of opposing pairs of brackets, with each pair adapted to provide an opening of a desired and predetermined size and shape to removably hold one of the service lines. In one embodiment, the plurality of opposing pairs of brackets may provide one or more openings of different shapes and/or sizes for removably holding different service lines.

BRIEF SUMMARY OF THE DRAWINGS

In FIG. 1, the boom system is in a first, undeployed position, such as for transit to or from a site location.

DETAILED DESCRIPTION

Figure 1:
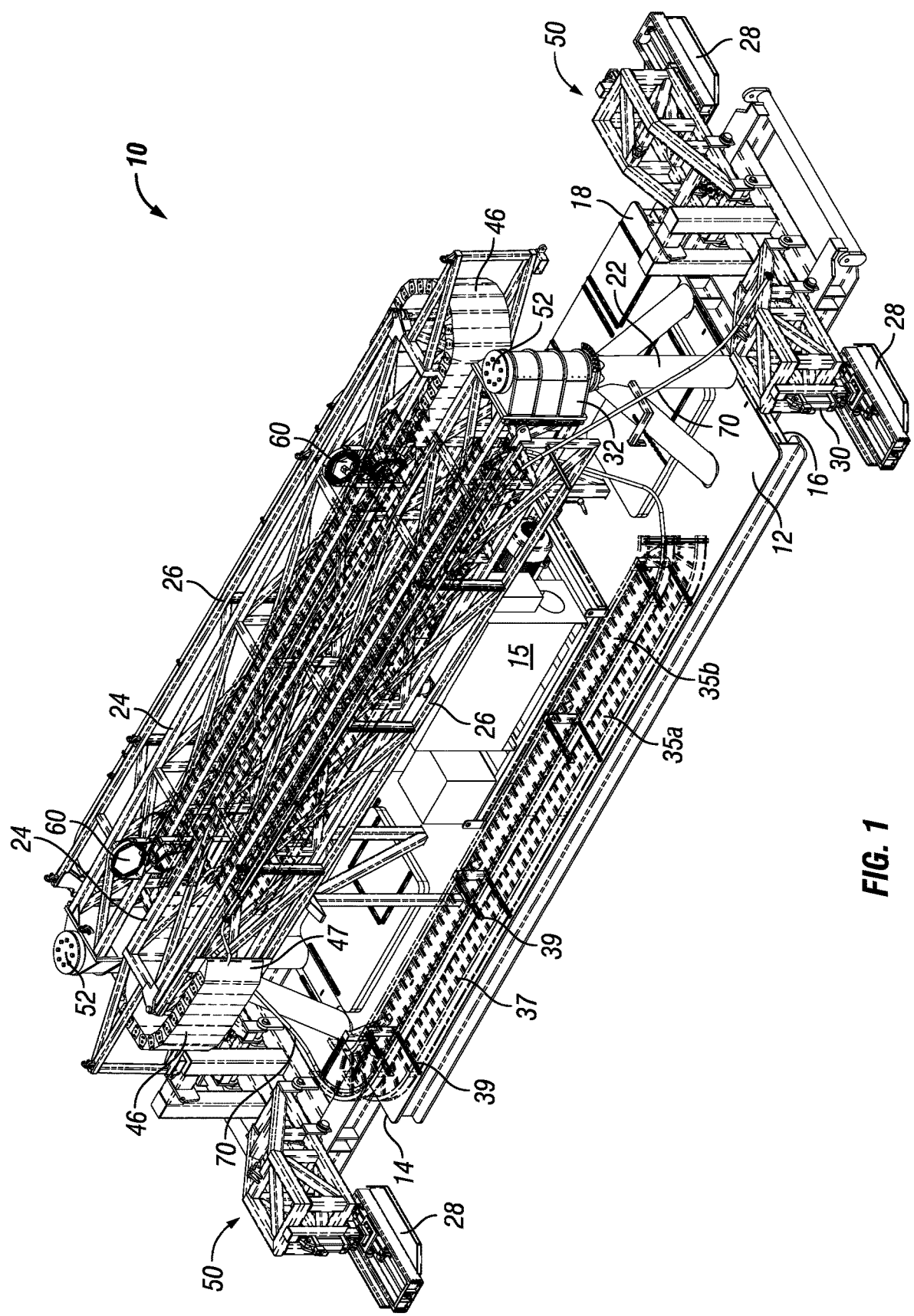
FIG. 1 is an isometric view of a boom system in accordance with one embodiment of the present disclosure.

FIGS. 1-5 show a mobile boom system 10 in one embodiment in a first, undeployed position. For ease of reference for the reader, like items and features in the various Figures are given the same numerals. It will be appreciated that the boom system 10 includes a skid 12 having a first end 14 and a second end 16, and a bottom or floor portion 18. Two posts 20 and 22 extend substantially vertically up from the floor 18 of the skid 12, with the first post 20 located near or proximal the first end 14 of the skid 12 and the second post 22 located near or proximal the second end 16 of the skid 12. It will be appreciated that the skid 12 need not be rectangular as illustrated in FIG. 1, and that posts 20 and 22 need not be located at opposing ends of the skid 12 as shown in FIG. 1, but may be located in first and second locations. In addition, each post 20 and 22 has pivotally mounted thereon or attached thereto one end of a first or primary boom 24, with the second end of each first boom 24 pivotally attached to a first end of a second or secondary boom 26. The first and second booms are each pivotally connected by pin assemblies 44 and drag chains 46.

As shown in FIGS. 1-5, it will be appreciated the booms 24 and 26 and the posts 20 and 22 are all located within an area above the floor 18 of skid 12 in the first, undeployed position shown. Because the posts 20 and 22 and the booms 24 and 26 are located within the area defined by the area of the floor or bottom 18 of the skid 12, the entire assembly of the skid 12, posts 20 and 22, and booms 24 and 26 can be more easily transported and loaded or unloaded while in this first, undeployed position. It will be appreciated that, although FIGS. 1-5 show the mobile boom system 10 with a single skid 12, two posts 20 and 22, and two two-piece boom assemblies 24 and 26 attached to each of the posts, the skid 12 can be of a different shape or configuration, or multiple skids may be used. Similarly, more or less booms may be connected and attached together than the two two-piece boom configuration shown in FIGS. 1-5. For example, a single boom might be attached to one post and a three-boom assembly (not shown) might be attached to the second post if desired. In addition, it will be appreciated that a single post might be used with the skid 12, or that three or more posts might be used with the skid 12, although not shown. Similarly, although both sets of booms 24 and 26 are shown as of equal length, the length of the two sets of booms 24 and 26 may vary, such as by providing a longer or shorter primary boom 24 or a longer or shorter secondary boom 26 on one set of booms than is the case with the other set of booms 24 and 26.

Also shown in FIGS. 1-5 are four crawler assemblies 50, one at each of the two corners of the two ends of the skid 12. The crawler assemblies 50 each include a single pad 28, adapted to move independently of one another and each may move up, down, laterally, and/or transversely in response to operator commands. As shown best in FIGS. 1, 2, and 5, each end of the skid 12 has two pads 28 located on opposing sides of the crawler assembly 50 and on opposing sides of the skid 12. The crawler assemblies also include hydraulic actuators 30, each of which is connected to one of said pads 28. The hydraulic actuators 30 may be selectively activated and controlled via a control system (not shown) including a processor, computer software, and a controller, with the controller connected either wirelessly or by an extended wire connection in order to allow an operator to operate the controller at a distance remote from the skid 12. Although pads 28 are shown in the figures, it will be appreciated that other means for moving the skid 12 can be provided, such as, for example, a combination of wheels and various types of motors instead of the pads and the hydraulic actuators 30, such as shown and described for use in connection with a drilling rig, for example, in U.S. Pat. No. 7,624,831, issued to Orr et al. on Dec. 1, 2009, and entitled "Method and Apparatus for Moving in Formation the Modular Components of a Drilling Rig from Well to Well," which is hereby incorporated by reference as if fully set forth herein. However, a "walking" skid such as shown in FIGS. 1-5 is believed to be more flexible for operation in a wider range of well site locations, such as if mud, snow, ice, or uneven terrain exists at the drilling site as is often the case.

The pads 28 can be permanently or removably attached to the crawler assemblies 50, and/or the crawler assemblies 50 can be permanently or removably attached to the skid 12. It will be appreciated that the transportation of the boom system 10 can be easier if the skid 12 fits onto a conventional truck. If the crawler assemblies 50 and/or pads 28, together with the skid 12, exceed the conventional size for a load on a truck, then having the crawler assemblies 50 and/or pads 28 removably attached allows for easier transportation of the boom system 10 by placing the skid 12 onto a truck or other mode of transportation and placing the crawler assemblies 50 and/or pads 28 on top of the skid 12 (for example) for transportation, and then attaching the crawler assemblies 50 and pads 28 to the skid 12 at the drilling site.

In order to move the mobile boom system 10 with the four pads 28 as shown in FIGS. 1-5, vertical hydraulic actuators 30 can be used to lift the skid 12 vertically from the pads 28, then horizontal hydraulic actuators 30 can be used to move the pads 28 horizontally. The skid 12 can then be lowered back onto the pads 28 and rests at the new position. As this process is repeated, the boom system 10 can be moved by "walking." Alternatively, the skid 12 may be lifted and one or more pads 28 can be moved in a direction which corresponds to the longitudinal axis of the skid 12 and/or to the transverse axis of the skid 12, thus allowing the skid 12 to move in any direction and to change its orientation as may be desired, and as shown in an example provided by the series of views provided by FIGS. 9-11. It will be appreciated that more or less pads 28 (and related hydraulic actuators 30 and control equipment) than four may be provided, and that the pads 28 may be placed in alternative configurations with respect to the skid 12 (e.g., such as on the sides of the skid instead of or in addition to the ends of the skid 12). In addition, it will be appreciated that (although not shown) the boom system 10 may also have one or more hydraulic actuators 30 attached to one or more of the booms 24 and/or 26, or may have one or more motors and gear and chain systems, together with a control system, in order to allow an operator to move one or more of the booms 24 and/or 26 as desired by use of a controller (like the controller for the operation of the pads).

Figure 3:
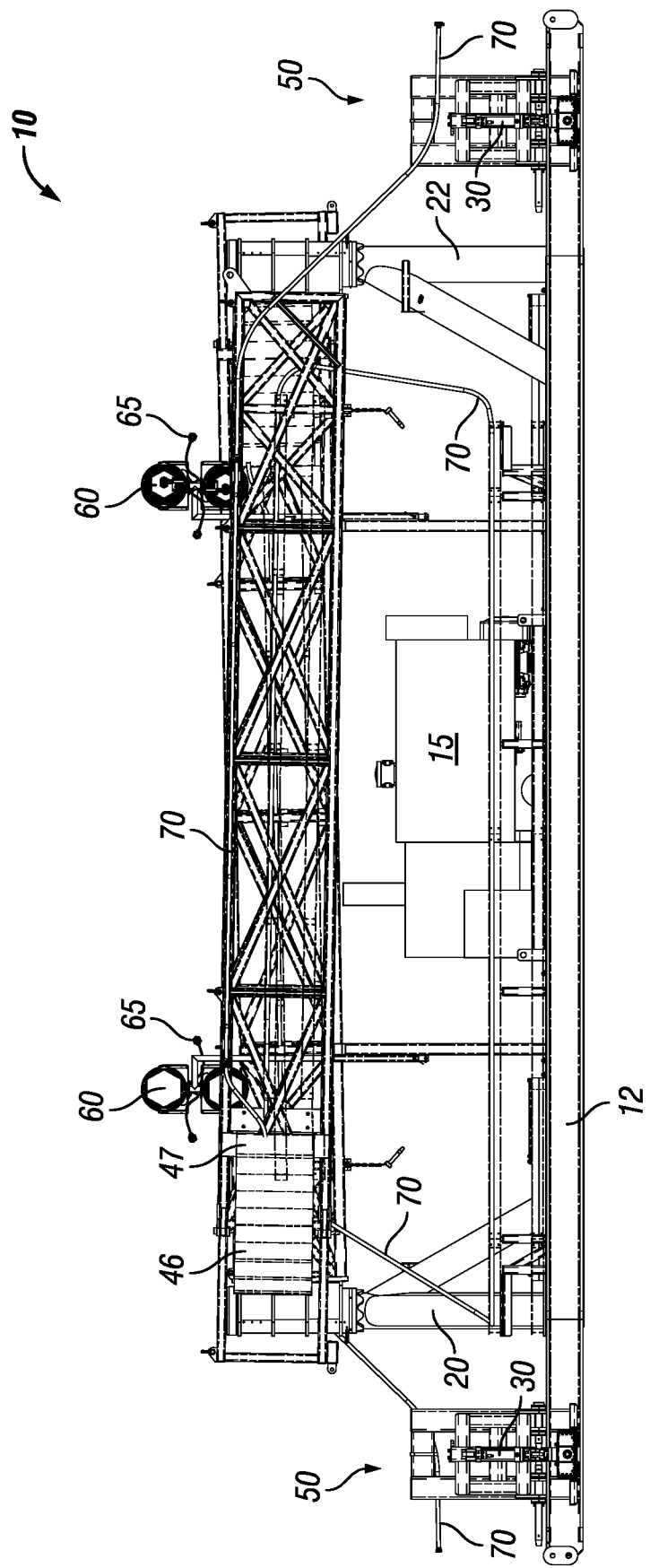
FIG. 3 is a side view of the boom system of FIGS. 1 and 2.
Figure 4:
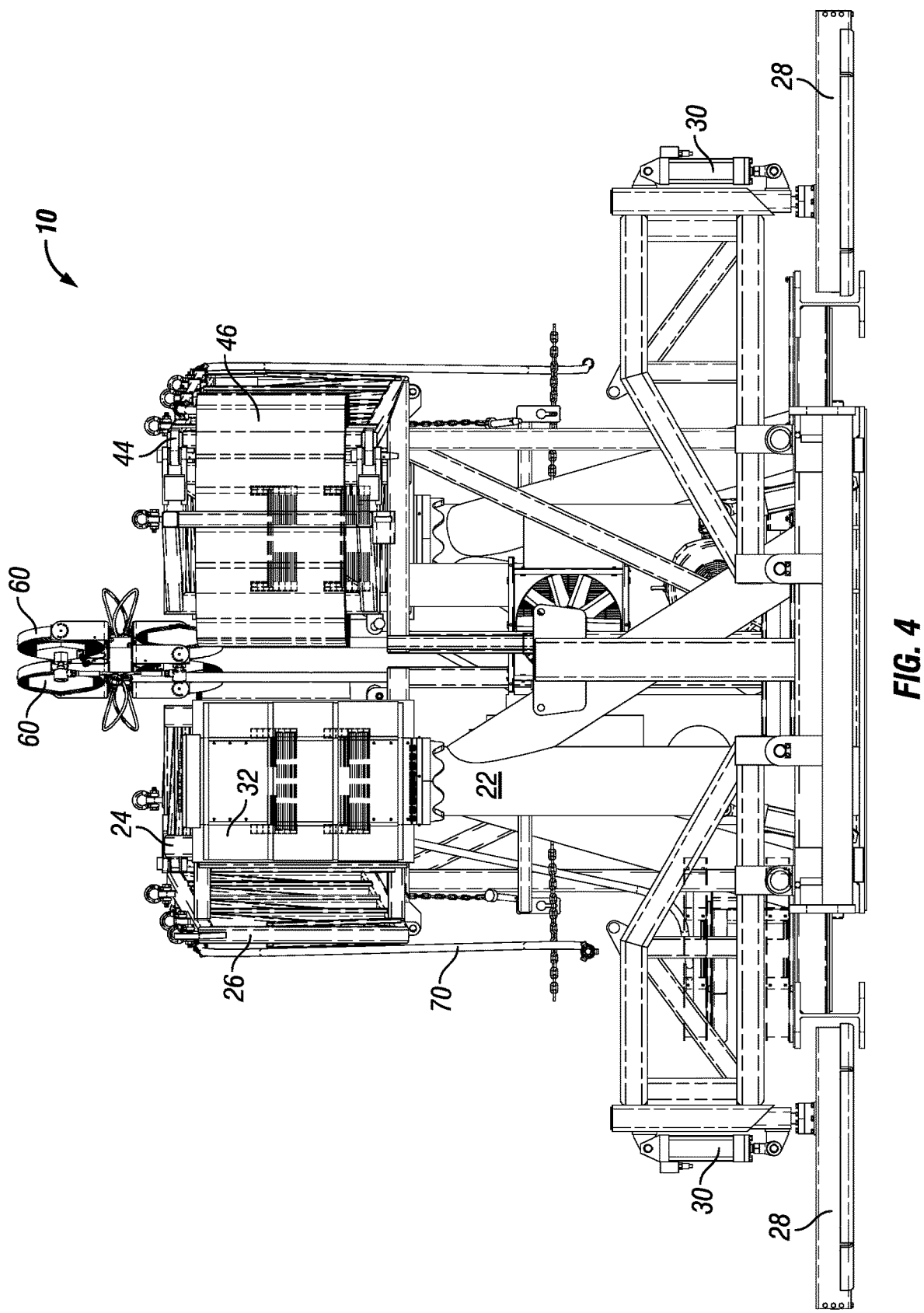
FIG. 4 is an end view of the boom system of FIGS. 1-3.
Figure 5:
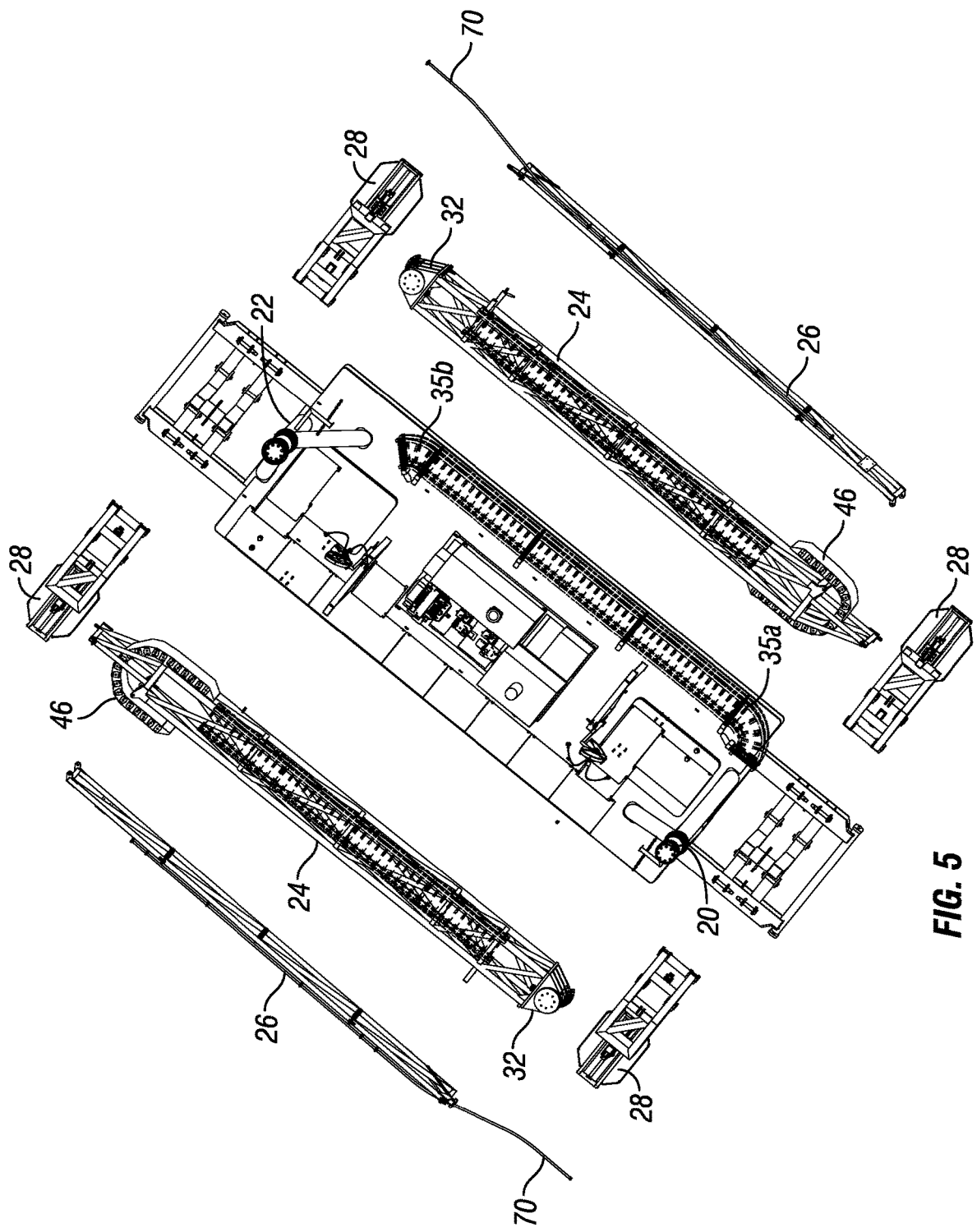
FIG. 5 is an exploded isometric view of the boom system of FIGS. 1-4.

Referring now to FIGS. 1 and 3, a hydraulic power unit 15 is shown. The power unit 15 sits on the top of the skid floor 18 and (when the booms are in an undeployed position) under the booms 24, 26. The power unit 15 can be entirely self-contained, such as having one or more engines (not shown) to generate power, fuel tanks (not shown), and associated hydraulics and control equipment (not shown). Although not shown, it will be appreciated that the hydraulic power unit 15 can be connected to each of the crawler assemblies 50 to provide hydraulic power to the crawler assemblies 50 and to the associated hydraulic actuators 30 at each crawler assembly 50 and for each pad 28. It will be appreciated that instead of hydraulic power units 50, other types of power units could be provided and located on the skid floor 28.

Referring now to FIGS. 1, 2, 5, 6, and 7 (among others), it can be seen that the mobile boom system 10 does not use a lug and pin connection assembly to attach the booms 24 to the posts 20 and 22 on the skid 12 (although such a connection is within the scope of the present disclosure). Instead, it can be seen that the first boom 24 attached at one end to each post 20, 22 comprises a generally rectangular frame, with one end 32 of such frame further having a generally triangular-shaped end 32 which is adapted to fit onto the top of the post 20 beneath the post cap 52 and allow for rotation of the boom around the post. This type of connection assembly provides the system 10 with a greater range of potential movement of the booms 24 and 26 relative to the posts 20 and 22 and the skid 12 (i.e., 360 degrees of rotation or close to that, and at least 270 degrees of rotation), and thus provides the system 10 with a great deal of flexibility and range of area of operation.

Figures 6A, 6B:
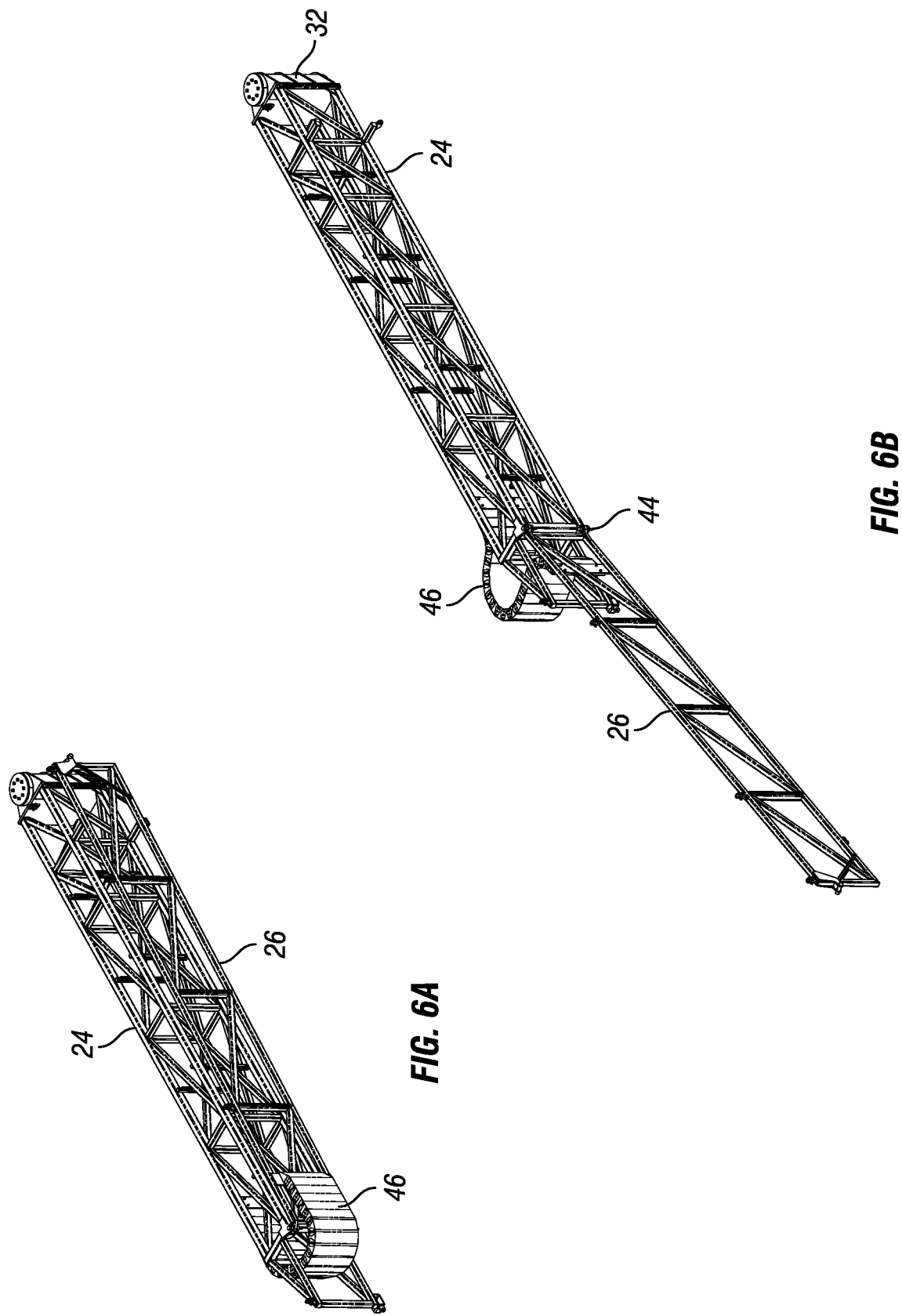
FIGS. 6A-6C are a series of isometric views of the boom components of the boom system of FIGS. 1-5.
Figure 6C:
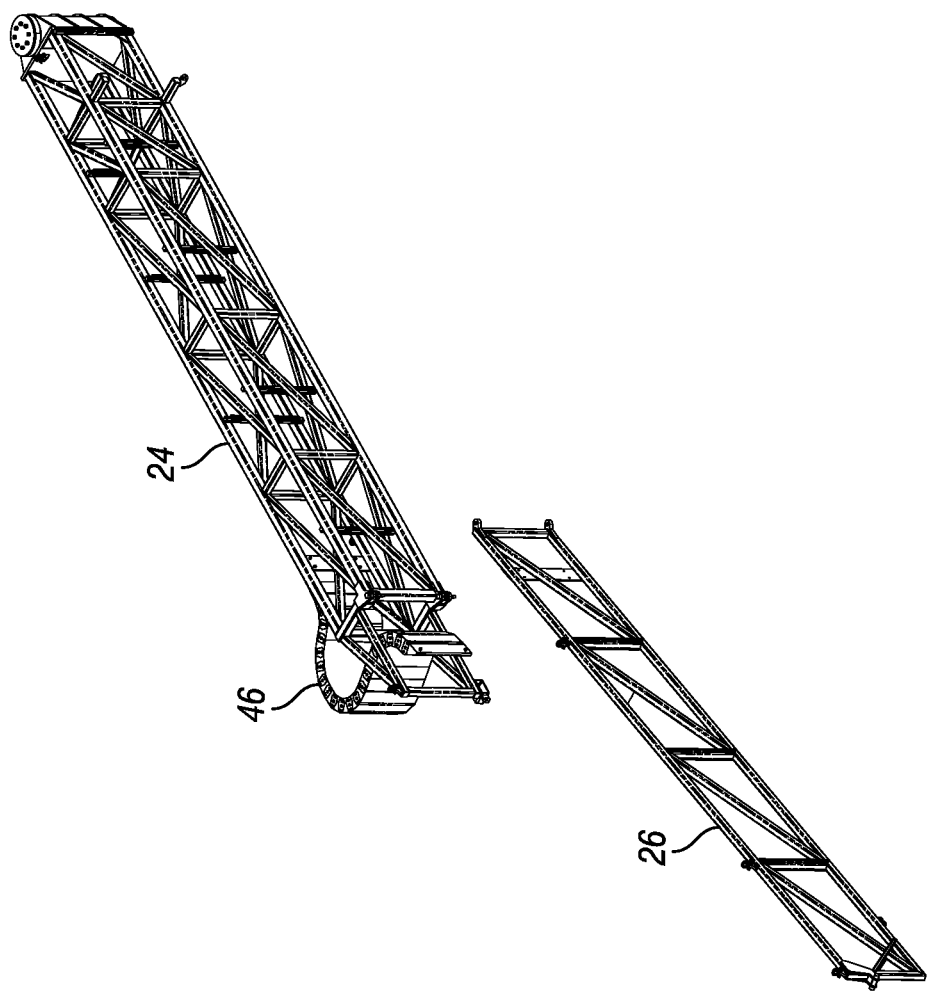

FIG. 6A-C includes three views of a first or primary boom 24 and second boom 26 boom: one where the two booms 24, 26 are attached to each other and in a first, undeployed position (A), one where the two booms 24, 26 are attached to each other and in a second, deployed position (B), and one view showing the two booms 24, 26 detached from one another (C). As can be seen in FIG. 6A-6C, as well as in other Figures, each of booms 24 defines a generally rectangular shape. Each of the booms 24 are shown with four longitudinally extending arms which extend in directions generally parallel to one another, and each of the booms 24 has a greater length than width. In addition, each of the booms 24 has cross-supports which extend generally at right angles to the longitudinal axis of the booms 24 and connect one of the four arms of the boom 24 with another arm of the boom 24, as well as cross-supports which extend diagonally between the cross-supports which are at right angles to the longitudinal axis of the boom 24. This structure thus provides excellent strength but does not make the boom as heavy or as costly as might otherwise be the case with an alternative structure. In addition, FIGS. 6A-6C (as well as other Figures) show that the second booms 26 each have a top arm and a bottom arm which extend generally parallel to one another in a longitudinal axis of the boom, and booms 26 further have cross supports which extend between the two parallel arms, including supports which generally run at right angles to the longitudinal axis of the boom 26 and supports which run diagonally from one arm to another arm of the booms 26.

As noted, one end of each of the primary boom 24 may be pivotally connected to one end of a secondary boom 26. It will be appreciated that the connection of the booms 24 and 26 may be accomplished in a variety of manners, such as a pin assembly in which the secondary boom 26 is attached to a pin (not shown) which in turn may rotate relative to the primary boom 24. Alternatively, a post assembly (not shown) could be used, such as one in which a cylindrical post is attached to the end of the primary boom 24 and the secondary boom 26 is pivotally attached to the post. Because the secondary boom 26 need not be as strong as the primary boom 24 (because the primary boom 24 supports the weight of the service lines and the secondary boom 26), the connection assembly for the pivotable connection of the primary boom 24 and the secondary boom 26 need not support as much weight as posts 20, 22.

The booms 24, 26 can be made of metal, such as steel, and can be made of other materials such as metal alloys like aluminum or titanium, composites such as fiber glass or carbon fiber, or even polymeric materials, such as plastics like polyetheretherketone, or combinations thereof, or any other such sufficiently strong and rigid material or combination of materials, such as can support the service lines to be held thereby. Those skilled in the art will appreciate that the booms 24 and 26 may comprise different materials. For example, boom 24 could comprise a first material and boom 26 could comprise a second material. Similarly, the booms 24 may comprise different materials from one another, and the booms 26 could comprise different materials from one another. The bottom arm(s) of the booms 24, 26 are designed to be about 3 feet to about 7 feet above the floor 18 of the skid 12. It will be appreciated that if the bottom of the booms 24 and 26 are 5 feet or higher from the floor 18 of the skid 12, there should be clearance for workers and other equipment at the drill site to pass underneath the booms 24 and 26 more easily. The posts 20, 22 can be made of metal, such as steel, and can be made of other materials such as metal alloys like aluminum, titanium, composites such as fiber glass or carbon fiber, or even polymeric materials, such as plastics like polyetheretherketone, or combinations thereof, or any other such sufficiently strong and rigid material or combination of materials, such as can support the service lines to be held thereby, and can be attached to the skid 12 by means of permanent weldment or by semi-permanent means including, but not limited to, bolts, pins, or any other such mechanical fastener. However, it will be appreciated that other materials and attachment methods can be used, and that the height, length, width, size and shape of the skid 12, the posts 20, 22, the booms 24, 26, and the other features of the mobile boom system 10 can vary as may be desired.

Figure 2:
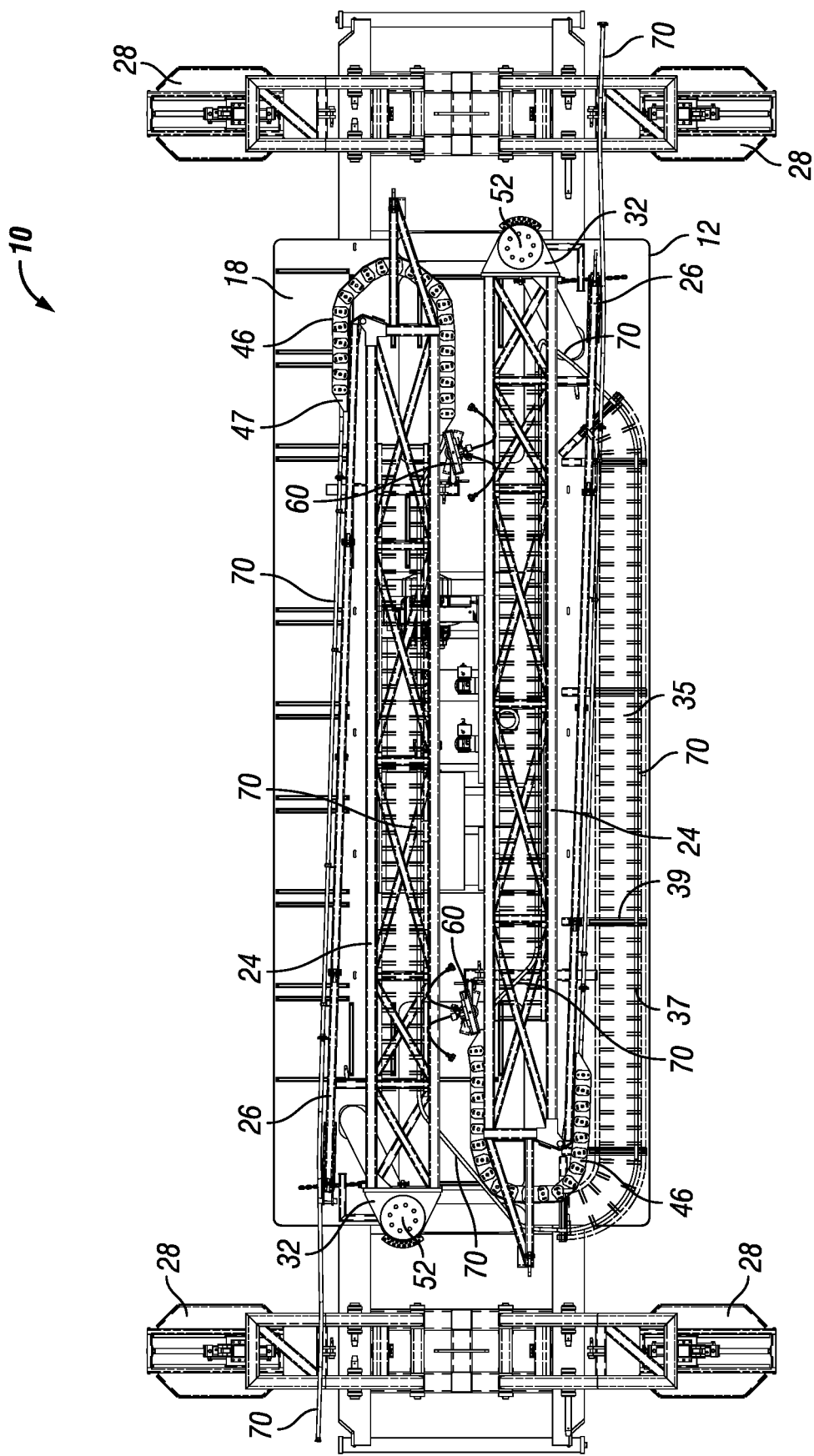
FIG. 2 is a top view of the boom system of FIG. 1.

The drag chains 46 can be of a conventional type, such as those consisting of segments bolted or otherwise attached together. As shown in FIG. 2, for example, each of the drag chains 46 have first and second ends 47, which can be bolted or otherwise attached to the side of the boom 24. The size and length of the drag chains 46 may vary. The length of drag chains 46 can be selected to restrict the potential amount of the rotation of the primary boom 24 and the secondary boom 26 relative to one another. For example, the drag chain 46 can comprise a plurality of segmented units in which the number of segments selected provides an overall length of the drag chain 46 such that the primary boom 24 and secondary boom 26 to which said drag chain 46 is attached may only be extended to an angle of 170 degrees or so from one another, as opposed to a full 180 degree (or more) angle. Using a bump stop pad located at the primary and secondary boom pivot point to so restrict the relative movement of booms 24 and 26 thus avoids situations in which the service lines attached to the booms 24 and 26 might be overly stressed or stretched, such as by relative movement of the booms 24 and 26 to an angle of 180 degrees or more. It will be appreciated that, although the two drag chains 46 shown in the Figures have the same size and width, the boom system 10 may include drag chains 46 with different size, length, width or the like. For example, if the service lines to be supported and held by one set of booms 24 and 26 differs from the service lines to be held and supported by another set of booms 24 and 26, or if an allowed angle of rotation for one set of booms 24 and 26 is intended to be greater or smaller than the angle or relative rotation for the other set of booms 24 and 26, a longer or shorter, or a larger or smaller, drag chain 46 may be used for one set of booms 24 and 26. The drag chains 46 can also support the service lines as the service lines extend from the end of the primary boom 24 to the end of the secondary boom 26. Although not shown, the service lines can be attached to the interior surface of the drag chains 46. Doing so helps keep the service lines from drooping downward and also helps keep the service lines in the same order from top to bottom on the secondary boom 26 as the order of the service lines as attached to the primary boom 24.

Although those skilled in the art will appreciate that in most situations, a number of different service lines will be supported by the boom system 10, and that the services lines will be of different sizes and types, such as electric cabling, pneumatic piping, water piping, piping for other liquids and the like, FIGS. 1-5 show a single service line 70 for purposes of clearer illustration. Referring specifically to FIG. 2, as well as to FIGS. 1 and 3-5, it can be seen that the service line 70 is provided at a left side of the boom system 10, is supported on the outside of the top secondary boom 26, runs into and through the drag chain 46 on the top boom assembly shown in FIG. 2, and then runs along the inside of the top primary boom 24 (its bottom side as shown in FIG. 2), then proximal the left side of the top primary boom 24 in FIG. 2, the line 70 runs downward to the rack or tray 35. The rack 35 runs along the top surface of the skid 12 and extends along one edge of the skid 12. The rack 35 includes a series of a plurality of rods 37 which support the line 70 as it runs substantially the longitudinal length of the skid 12. At the right side of the tray or rack 35, which is proximal the right hand side of the skid 12 as illustrated in FIG. 2, the line 70 extends upwardly to the interior portion of the bottom primary boom 24, then extends longitudinally along substantially the length of the primary boom 24 and, proximal the left end of the primary boom 24, crosses the primary boom 24 transversely and extends into and through the drag chain 46 on the bottom boom assembly shown in FIG. 2. The line 70 extends from the drag chain 46 and is supported and held on the bottom side of the bottom secondary boom 26 shown in FIG. 2 and extends past the end of the secondary boom and, as illustrated in FIG. 2, can extend over and past the pads 28 on the right hand side of the boom system 10. It will be appreciated that the use of terms such as "right", "left", "top", and "bottom" are used only for convenience with respect to FIG. 2 (and the other Figures of the present disclosure) and are not limiting in any sense. In addition, it will be understood that, although FIG. 2 (and FIGS. 1-5 in general) show only a single service line 70 for simplicity of illustration, it is likely that the boom system in operation may have in place of the single service line 70 shown a plurality of service lines, which may be a dozen or dozens of service lines of different sizes and for different services.

Although shown in various views in the various Figures, rack or tray 35 as shown in FIG. 1 has both a bottom layer 35a and a top layer 35b. Using two layers 35a and 35b for the rack 35 helps provide greater support for more service lines and also helps separate the service lines from one another. Keeping the service lines separate from one another, organized, and untangled can be important for, among many other reasons, ease of assembly and maintenance, limiting electrical noise caused by a plurality of electrical cables occupying the same small area, or, although not limited to, separating electrical service lines from hydraulic, water, pressurized air, or any other such resource a drilling rig might use. As also shown in FIG. 1, each layer 35a and 35b of the rack 35 has two opposing sides, from which rods or other supports 37 extend inwardly between the two opposing sides. The rods 37 help support the service lines. In addition, supports 39 can be used to support the rack's upper layer 35b above the lower layer. As shown in FIG. 1, for example, the two ends of the rack 35 can be curved to accommodate the curvature of the service lines as they enter and leave the rack 35. It will be appreciated that, although not shown, the service lines can be removably attached to the rack 35, such as by conventional cable or pipe clamps, retention bars, bolt-down clips, or any other sufficient means of semi-permanently securing the plurality of service lines contained within the trays. It will also be appreciated that the service lines can be supported by the top surface 18 of the skid 12 if desired instead of a lower rack 35a.

Also illustrated in FIGS. 1-5 are lights 60. As shown in FIGS. 1-5, the boom assembly may have a plurality of lights 60, which may be movable and which can be used to illuminate the boom assembly 10 or the drilling site. Those skilled in the art will appreciate that the boom system 10 can be used without lights 60 or can be provided with more than the two lights 60 shown. The lights 60 can be used selectively, such as when the boom system 10 is in motion, or can be used whenever low light or nighttime conditions exist and more illumination is desired. The lights 60 can be provided with plugs 65 which can be attached to one or more electrical service lines or can be attached to the generator 15 on the skid 12 or to another power source (not shown).

Figure 7:
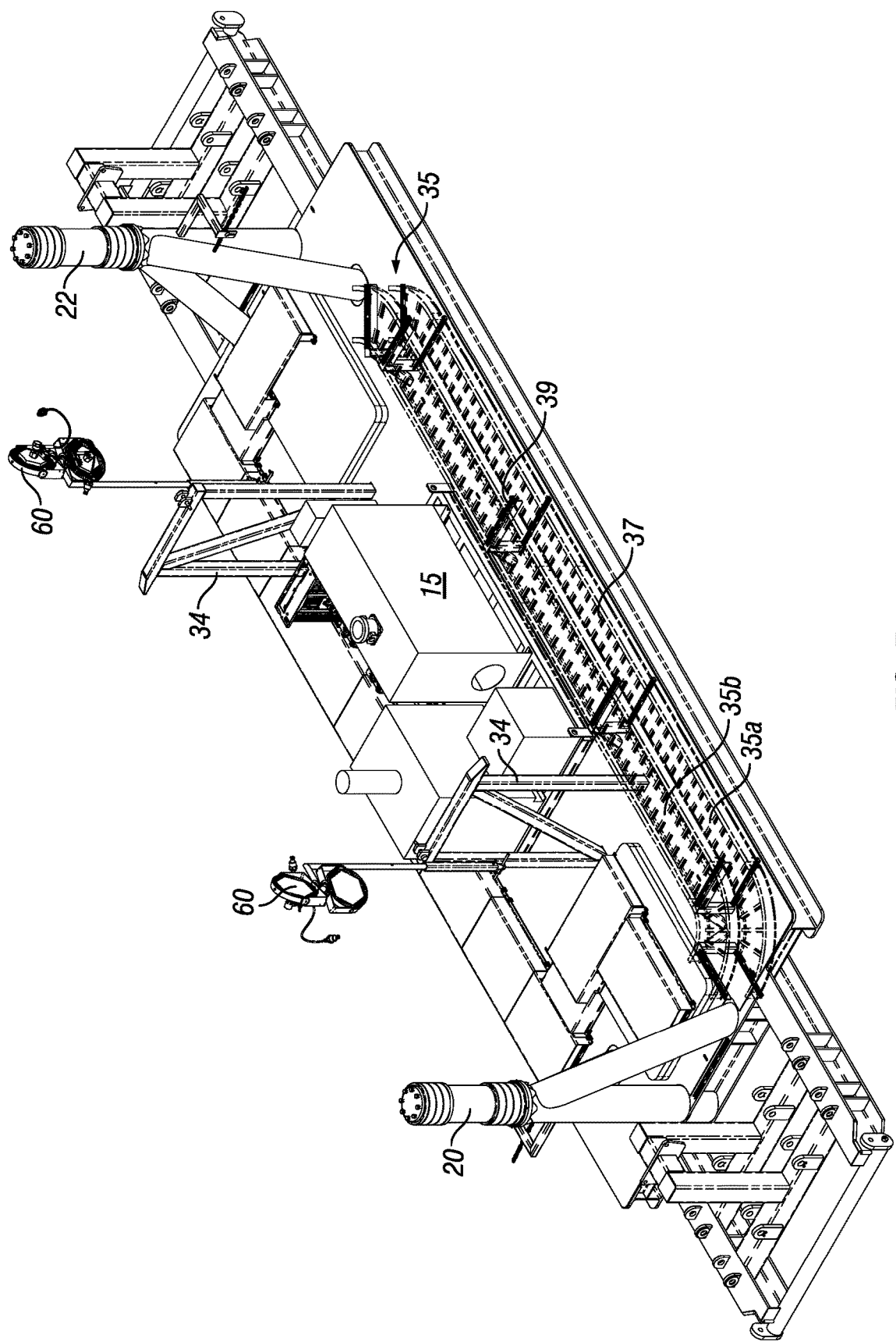
FIG. 7 is a partial isometric view of the skid and related features of the boom system of FIGS. 1-5.

In FIG. 7, more detail regarding the skid 12 is provided and can be seen in this view (which does not include the booms 24, 26). This view shows a plurality of horizontally mounted racks or trays 35a and 35b which are located on or above the floor 18 of the skid 12. The racks or trays 35a and 35b run generally longitudinally along the longitudinal length of the skid 12; the racks or trays 35a and 35b are adapted to removably hold and support a plurality of cables, pipes, wires, conduits, and the like, which can be connected to or continuations of cables, pipes, wires, conduits, and the like for the rig utilities held by one or both of the booms (not shown in this figure). It will be appreciated that, although as shown the tray 35 (comprising in this view the upper tray 35b and the lower tray 35a) has its transverse axis in a horizontal orientation on or above the floor of the skid 12, the tray 35 could be located at another angle or even run perpendicular to the skid floor 18 if desired. In addition, the racks or trays 35a and 35b could be located inside the floor 18 of the skid 12, or the mobile boom system 10 could, instead of having rack or tray 35 support the cables, pipes, wires, conduits, and the like, some or all of such cables, pipes, wires, conduits, and the like could instead be located directly on the top of the floor 18 of the skid 12. In one particular embodiment, the skid floor 18 generally defines a rectangular shape that is about 46 feet long and about 12 feet wide (not including the crawler assemblies 50 and pads 28).

It will also be appreciated from FIG. 7 that the rack or tray 35 generally runs along and is located at or near the edge of one side of the skid 12, and each of the posts 20 and 22 is offset from the center line of the skid 12. Although not shown in FIG. 7, it will be appreciated that this offset from center placement of the posts 20, 22 and the use of the supports 34, allows each of the two booms 24, 26 to rest on one of the supports 34 when the booms 24 are in an undeployed position. In addition, it can be seen that the lights 60 can be mounted on and elevated above the supports 34 by vertically extending members. Those skilled in the art will appreciate that the lights 60 may be of any variety of conventional lights, such as light emitting diode (LED) lights or other types. It will also be appreciated that elevating the lights 60 above the top of the booms 24 and 26 allow the lights 60 to illuminate the area surrounding the boom system 10 as may be desired. While the lights 60 are shown as facing opposing directions in FIG. 7, for example, the lights 60 can be mounted so they can be easily moved by an operator (e.g., by rotating one or both of the lights 60 and/or by pivoting one or both up or down) so that they can be directed to illuminate one or more areas of or around the boom system 10 as may be desired.

Figure 8:
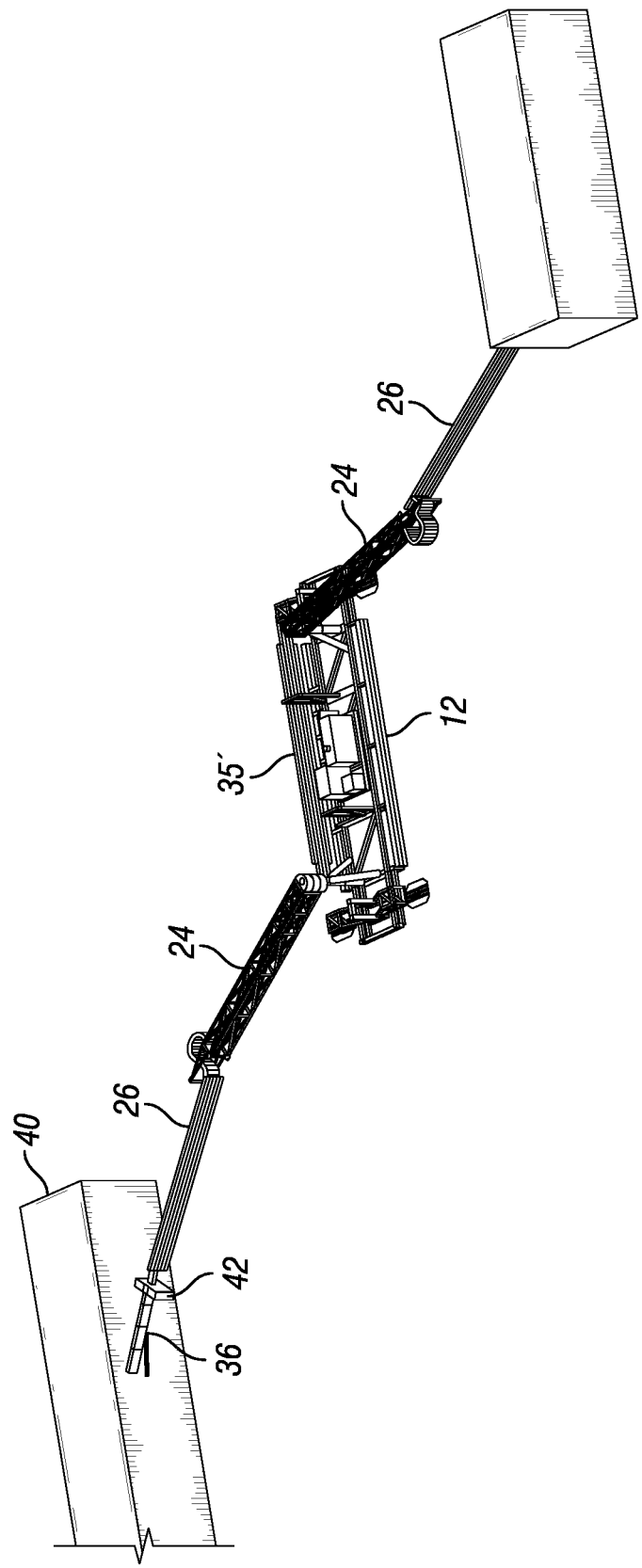
FIG. 8 is an isometric view of a boom system in accordance with an embodiment of the present disclosure in a second, deployed position.

FIG. 8 provides a view of a mobile boom system of the present disclosure in a deployed position. As can be seen, cables, pipes, wires, or the like are held and supported by the booms, and cables, pipes, wires or the like are also held and supported by the tray or cage 35' running the length of the skid 12. As shown in this FIG. 8, the tray or rack 35' is in a vertical position and runs substantially the longitudinal length of the skid 12. Those skilled in the art will appreciate that the rack 35' shown in FIG. 8 could be used in the embodiments shown in FIGS. 1-5, for example, and that the rack 35 shown in FIGS. 1-5 could be used in place of the vertical orientation of the rack 35' as shown in FIG. 8. Still referring to FIG. 8, a rig boom 36 extending to and removably attached to one end of a second boom 26 (in the upper left hand corner of this figure) is shown. This rig boom 36 extends from the side of a drilling rig 40 in this particular embodiment. As also shown in FIG. 8, a junction box 42 can be attached at or near the end of the rig boom 36. In this embodiment, the ends of the cables, pipes, and wires and the like that are held and supported by the boom 26 can be removably connected to the junction box 42, such as by plugging such cables and wires into receptacles therefor in the junction box 42, and connecting the pipes to appropriate receptacles or connections therefor provided on the junction box 42. It will be appreciated that more than one junction box 42 can be provided on the rig boom 42 and, alternatively, one or more junction boxes can be removably or permanently attached at or near the end of one or more of the boom 26 if desired.

Figure 9:
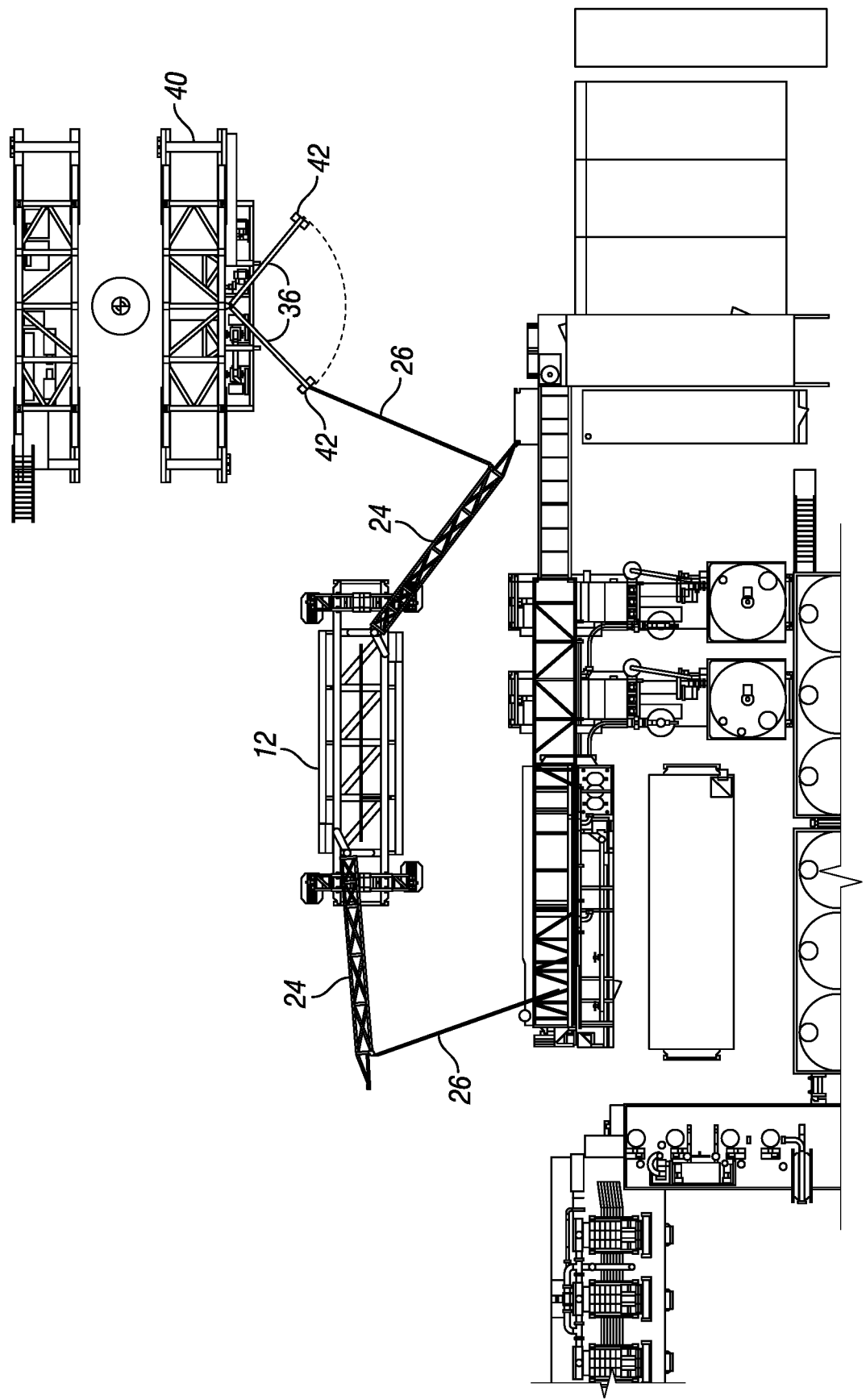
FIG. 9 is an top view of a boom system in accordance with an embodiment of the present disclosure with the boom system in a second, deployed position, with one end of a first boom extending from the skid connected to an end of a boom attached to a rig structure, and with one end of a second boom extending from the skid connected to a source of cabling, piping, or other resources.
Figure 10:
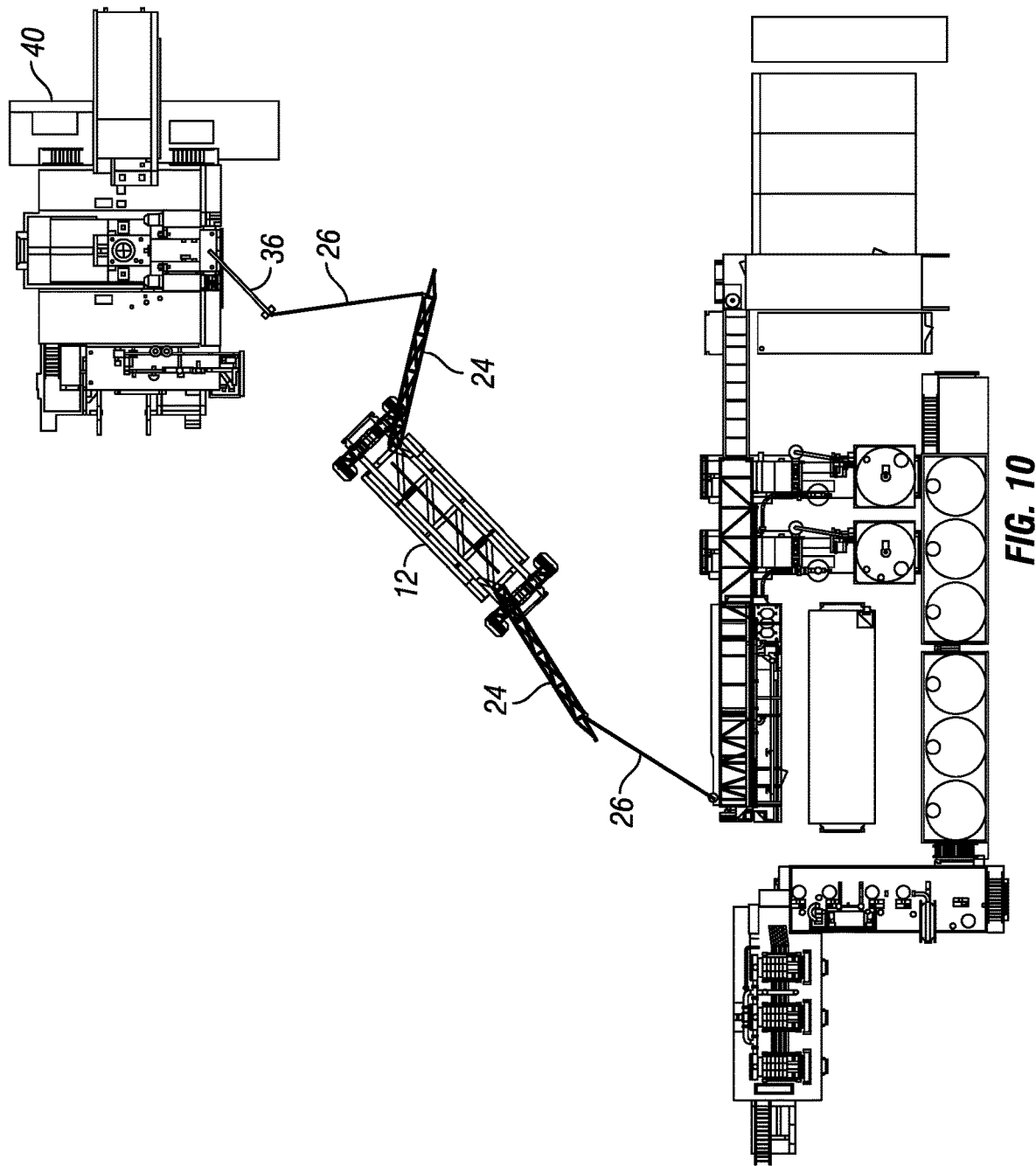
FIG. 10 is a top view of the boom system of FIG. 9 in a second position, in which the skid and booms extending from the skid have changed position in connection with a change of position of the rig.
Figure 11:
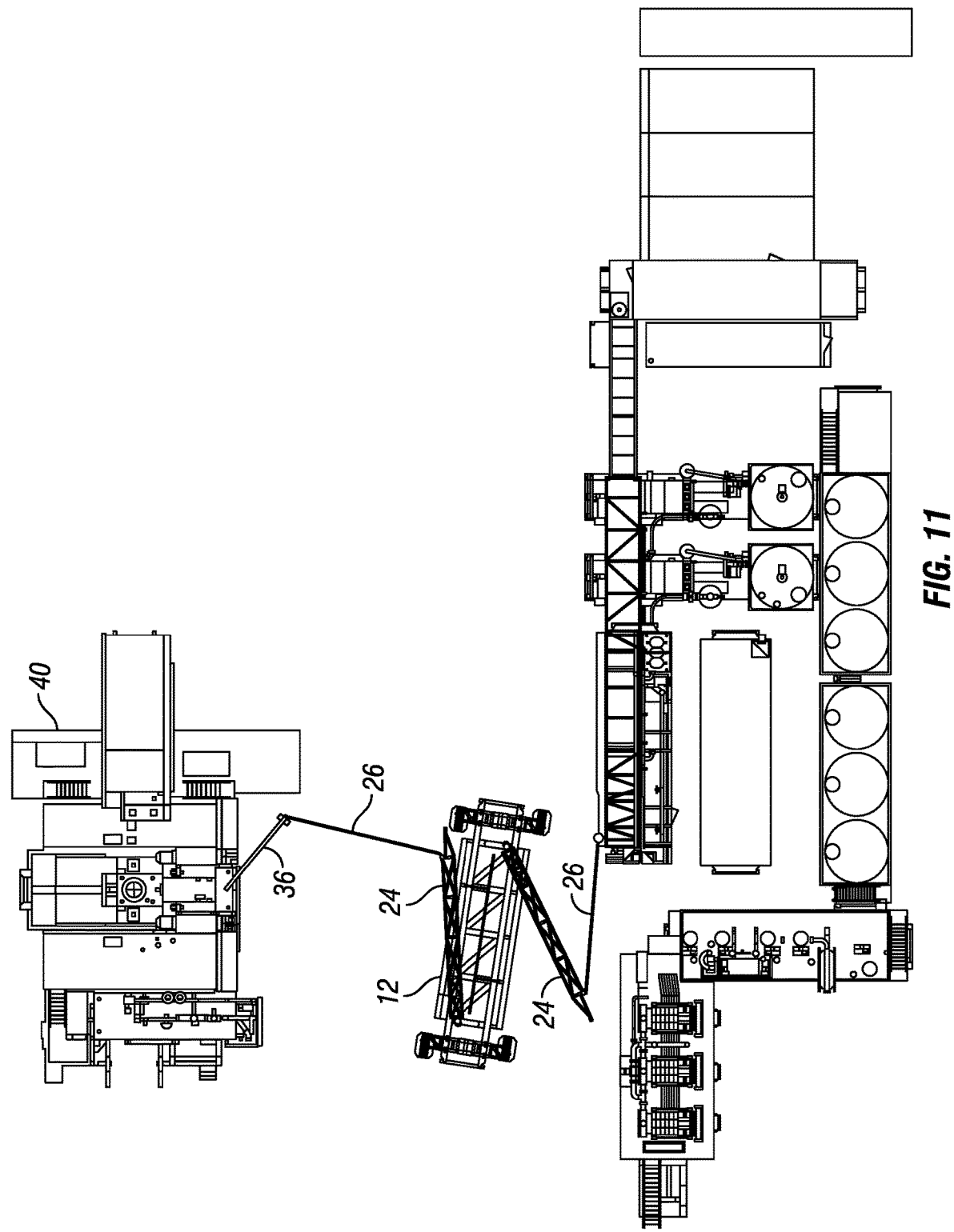
FIG. 11 is another top view of the boom system of FIGS. 9-10 in a third position, in which the skid and booms extending from the skid have changed position yet again in connection with another change of position of the rig.

In FIGS. 9-11, a series of views are provided of a mobile boom system at a drilling site location, which also includes a drilling rig 40 and various equipment for supporting the operations of the drilling rig 40. As shown in each of these three figures, the skid 12 and booms 24, 26 are positioned at the drilling site to allow for a connection of the utilities and the cables, piping, etc. for the same between the source of the utilities for the drilling rig 40 and for connection to an electrical switchgear and motor control package (the "MCC PKG") and the rig 40. In these three figures, the rig further includes a rig boom 36 with one or more junction boxes 42 attached proximal the end of the boom rig distal from the rig. In FIG. 9, the rig boom 36 is shown as two booms; however, this is shown as an illustration of the range of motion of a single rig boom 36 and its rotation from one position to another. Although the rig boom 36 is shown as limited to this approximately 45 degrees of rotation, it will be appreciated that the rig boom 36 in a particular embodiment can also rotate to a lesser or greater degree depending on the configuration of particular embodiments. As the rig 40 moves from right to left in this series of three figures, the potential selective movement, relative positioning, and orientation of the skid 12 and the booms 24, 26 is illustrated. As also shown in FIGS. 9-11, the cables, pipes, conduits, and the like held and supported by the booms 24, 26 are held above the bottom of the booms 24, 26. In one embodiment, the bottom of the booms 24, 26 are located at least 6.5 feet above the ground of the drilling site, although it will be appreciated that uneven terrain, local features at the drilling site, and/or the presence of other equipment may mean that not all of each of the booms 24, 26 is located at least this high above the ground.

Figure 12:
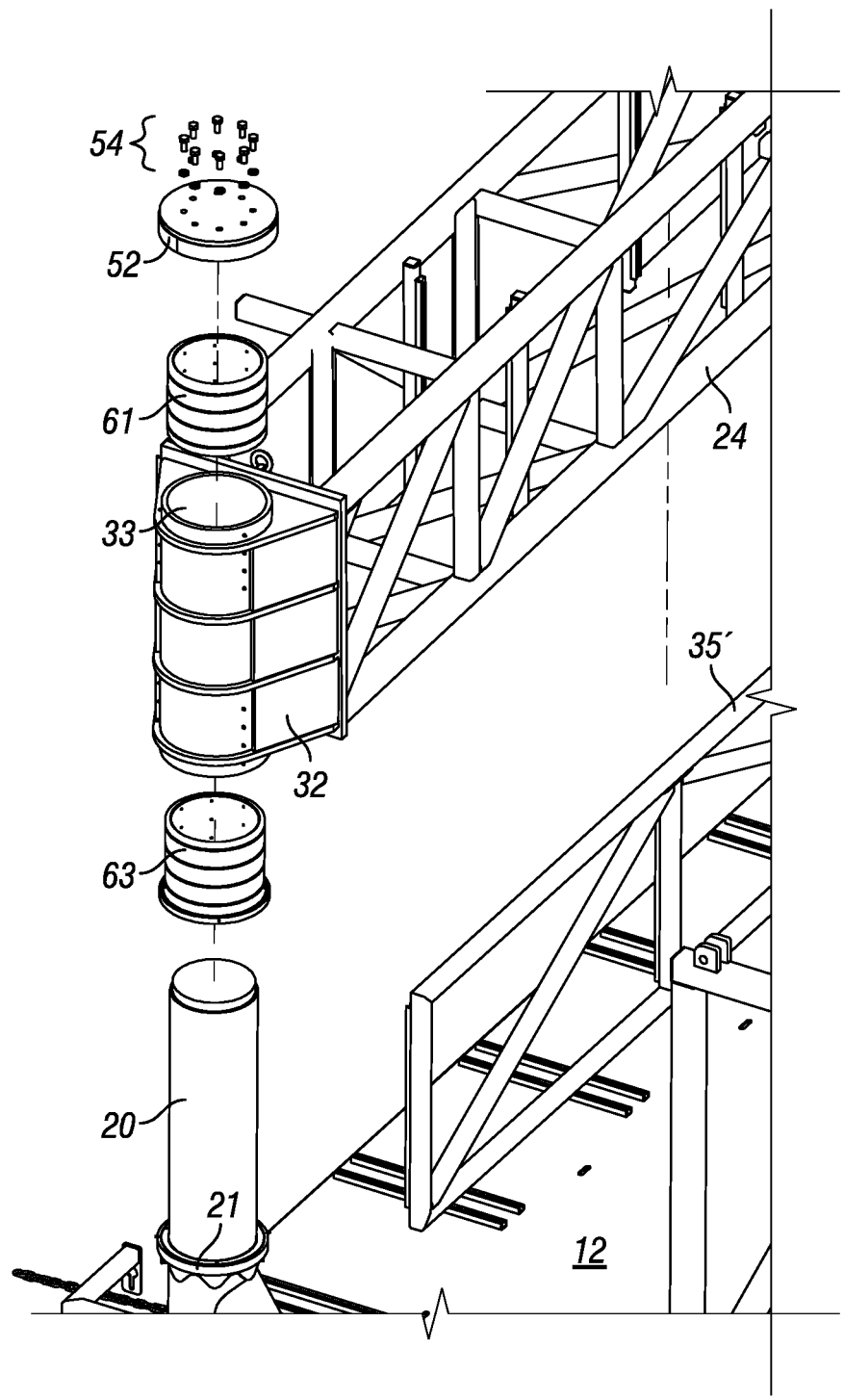
FIG. 12 is an exploded partial view of a post and boom connection assembly in accordance with the present disclosure.

In FIG. 12, a partial exploded view of the post 20 and the primary boom 24 connection is provided. Although only post 20 is shown in FIG. 12, it will be appreciated that post 22 may have the same or a different connection assembly as that shown for post 20 and primary boom 24 in FIG. 12. In FIG. 12, the connection assembly includes (shown from top to bottom) a plurality of bolts 54, a post cap 52, a first bushing 61, a primary boom end 32, a second bushing 63, post 20, with the post 20 including proximal its lower end a lip 21. The second bushing 63 is generally and substantially shaped as a hollow cylinder, with an inside diameter which is slightly greater than the outside diameter of post 20. The second bushing 63 fits over and around the post 20 and is held in position proximal the lower end of the post 20 by the lip 21 of the post 20. The lip 21 is an annular ring and has an outside diameter which is greater than the inside diameter of the second bushing 63.

Still referring to FIG. 12, the end 32 of the primary boom 24 defines a shape that is generally like a triangular prism, except that the triangular corner at the very end of the primary boom 24 is rounded. The end 32 has an opening 33 therethrough that extends parallel to the transverse axis of the primary boom 24. The interior diameter of the opening 33 is slightly larger than the outside diameter of the second bushing 63, and so the opening 33 and the end 32 of the primary boom 24 fit over and onto the second bushing 63. Similarly, the first bushing 61 is generally a hollow cylinder, and has an outside diameter which is slightly less than the inside diameter of the opening 33. The first bushing 61 thus fits inside the opening 33. The first bushing 61 is attached to a post end cap 52 by bolts 54, which fasten the cap 52 to the top end of the first bushing 61. It will also be appreciated that the bolts 54 can fasten the cap 52, the first bushing 61 and the top of the post 20. although it will be appreciated that a variety of different materials may be used for first bushing 61 and second bushing 63, and that the bushings 61, 63 may comprise different materials, the bushings 61, 63 can be made of aluminum, bronze, or an aluminum/bronze alloy to provide a surface with less friction to allow the primary boom 24 to rotate easier and require less force for moving the boom 24.

Figure 13:
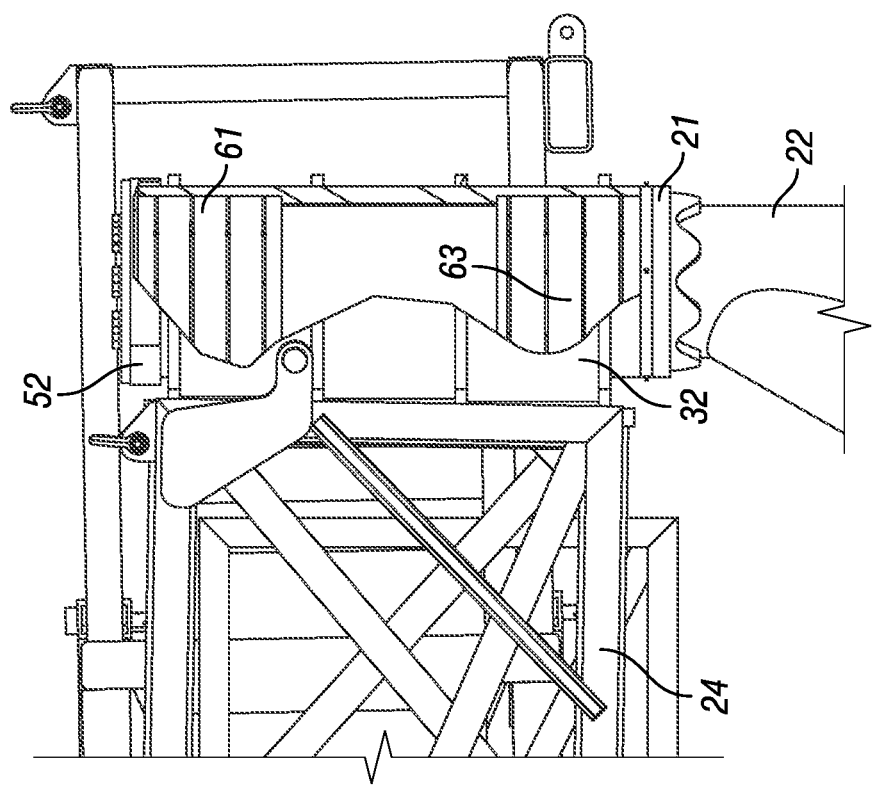
FIG. 13 is a partial sectional view of the boom and post connection assembly shown in FIG. 12.

In FIG. 13, a partial sectional view of the connection assembly for the post 20 and primary boom 24 is provided. As shown in FIG. 13, the end 32 of the primary boom 24 is located around a top portion of the post 20, with the post cap 52 bolted to the top end of the first bushing 61. The first bushing 61 and the second bushing 63 are located within cylindrical passageway extending generally vertically through the end 32, with the first bushing 61 located around and encircling a top portion of the post 20 and the second bushing 63 located around and encircling a lower portion of the post 20, and with the bottom end of the second bushing 63 resting on the top surface of the lip 21.

Figure 14:
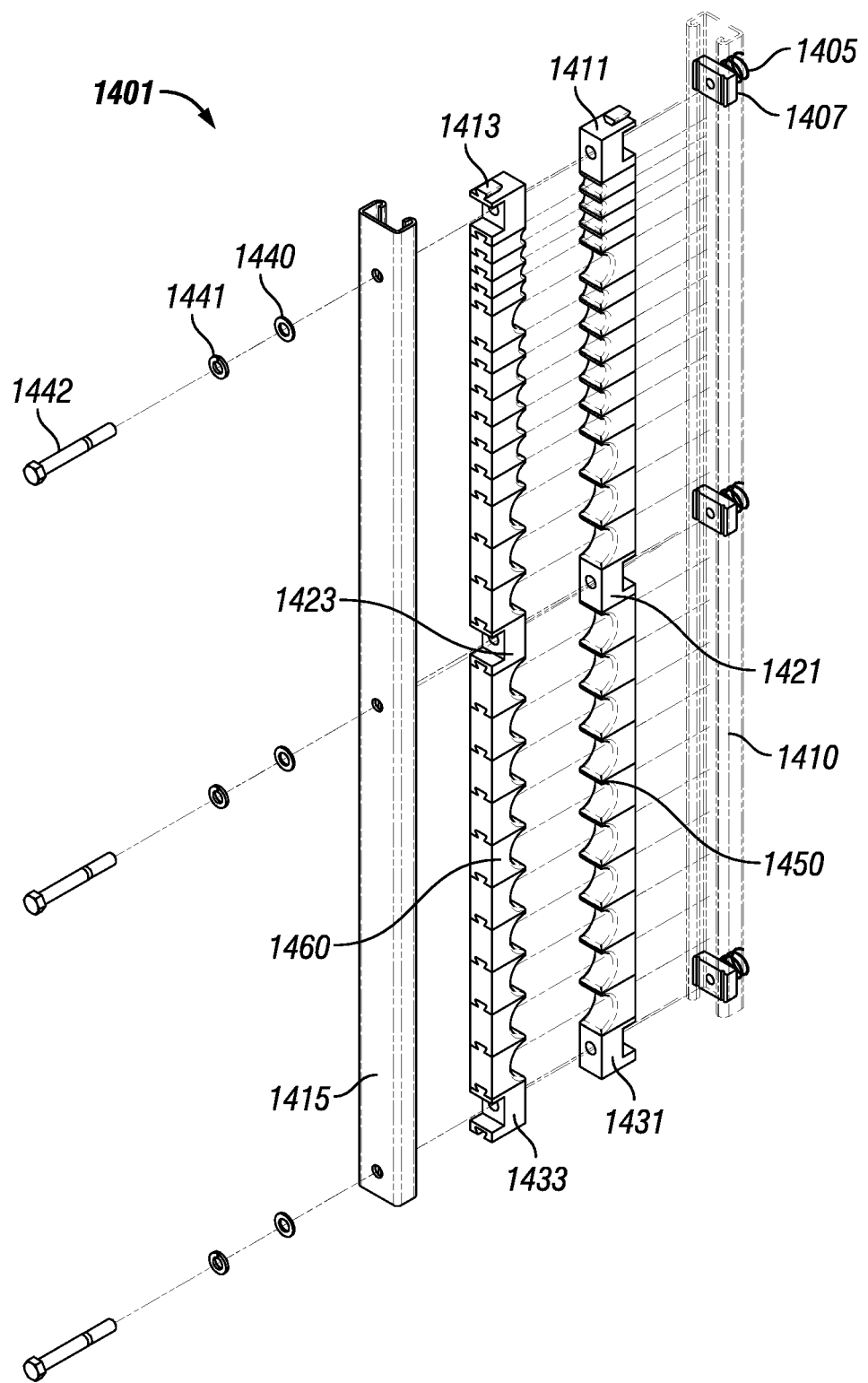
FIG. 14 is an exploded isometric view of a rack or modular service line handling system.

Referring now to FIGS. 14-18, examples of a rack apparatus for holding piping, cabling, and/or service lines on a boom are illustrated. In FIG. 14, an exploded isometric view of a service line holder system, or rack, 1401 is shown. In FIG. 14, the system 1401 includes two opposing brackets 1410 and 1415, which can have their longitudinal axes running in a substantially vertical direction as shown. Either or both of brackets 1410 and 1415 can be attached to a boom. As shown in FIG. 14, the service line holding system 1401 includes a plurality of opposing connection units 1411 and 1413, 1421 and 1423, and 1431 and 1433, respectively, from top to bottom of the illustration in FIG. 14. Each pair of opposing units is adapted to be removably and securely connected to each other and to connect the two opposing brackets 1410 and 1415 together. As illustrated in FIG. 14, the connection may be achieved by using a plurality of bolts 1442, washers 1441 and 1440, with the each of the bolts 1442 extending through a corresponding hole in each of brackets 1415 and 1410. In addition, each of the bolts 1442 passes through openings in a corresponding one of the first connection units 1413 and through an opening in one of the corresponding second connection units 1411. The bolts 1442 can be secured to one of the corresponding blocks 1407, which is held in place within the bracket 1410 and is urged towards bracket 1415 by a corresponding spring 1405. In addition to the series of three opposing pairs of connecting units 1411 and 1413, 1421 and 1423, and 1431 and 1433, it can be seen that located in between each pair of the connecting units are a plurality of opposing pairs of brackets 1450 and 1460. As illustrated in FIG. 14, the various pairs of opposing brackets may vary in size and shape. By varying the size and/or shape of the opposing pairs of brackets 1450 and 1460, the service line holding system can be adapted to removably and securely hold a variety of different sizes and shapes of cables, pipes, and service lines on one of the booms of the present disclosure.

Figure 15:
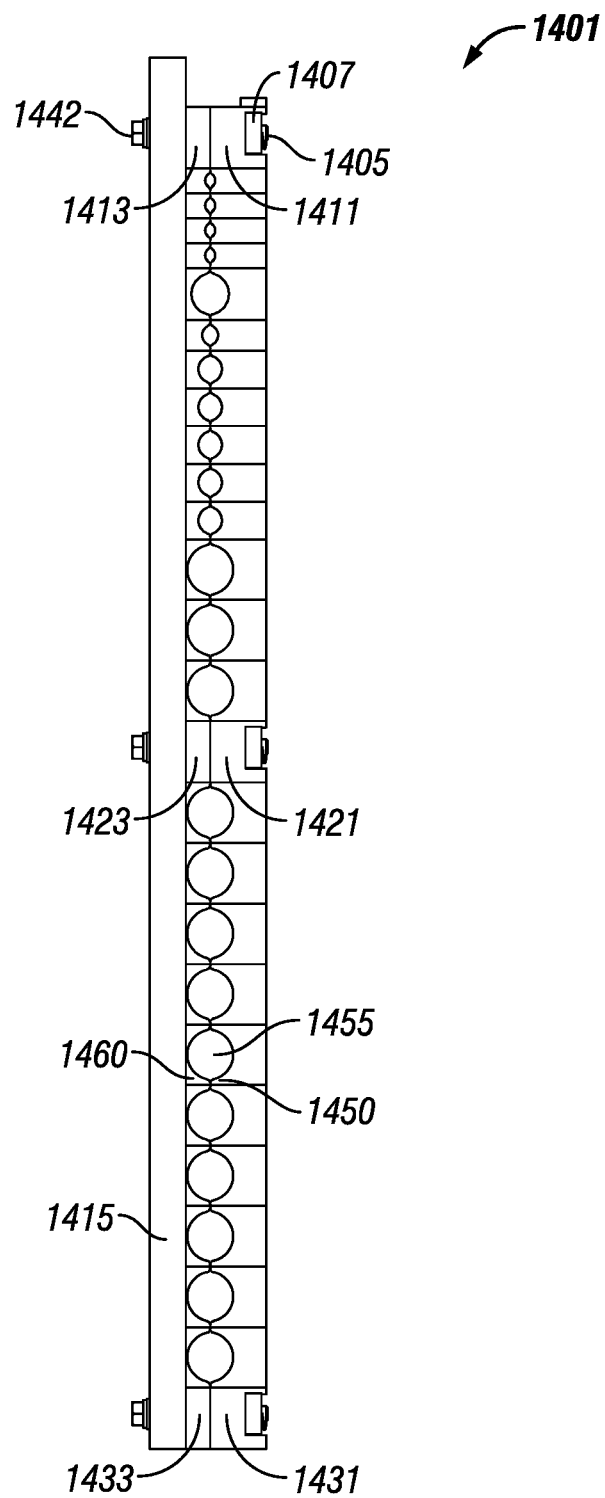
FIG. 15 is a side view of an assembled service line handling system.

In FIG. 15, a side view of the assembled service line holding system 1401 is provided. For convenience of the reader, like items and features in the figures have like numbers. As illustrated in FIG. 15, each of the opposing pairs of connecting units (1411 and 1413, 1421 and 1423, and 1431 and 1433) are in contact and adjacent to the corresponding connecting unit. Similarly, each of the opposing pairs of brackets 1450 and 1460 have a top portion and a bottom portion which are in contact with the corresponding opposing bracket, and further define an opening 1455 between the two opposing brackets 1450 and 1460. It will be appreciated that the size and shape of the openings 1455 defined by the pairs of opposing brackets 1450 and 1460 can be determined by the size and shape of the brackets 1450 and 1460, and, as illustrated in FIG. 15, the openings 1455 can vary accordingly in size and shape as may be desired to removably hold various sizes and shapes of cables, pipes, and service lines.

Figure 16:
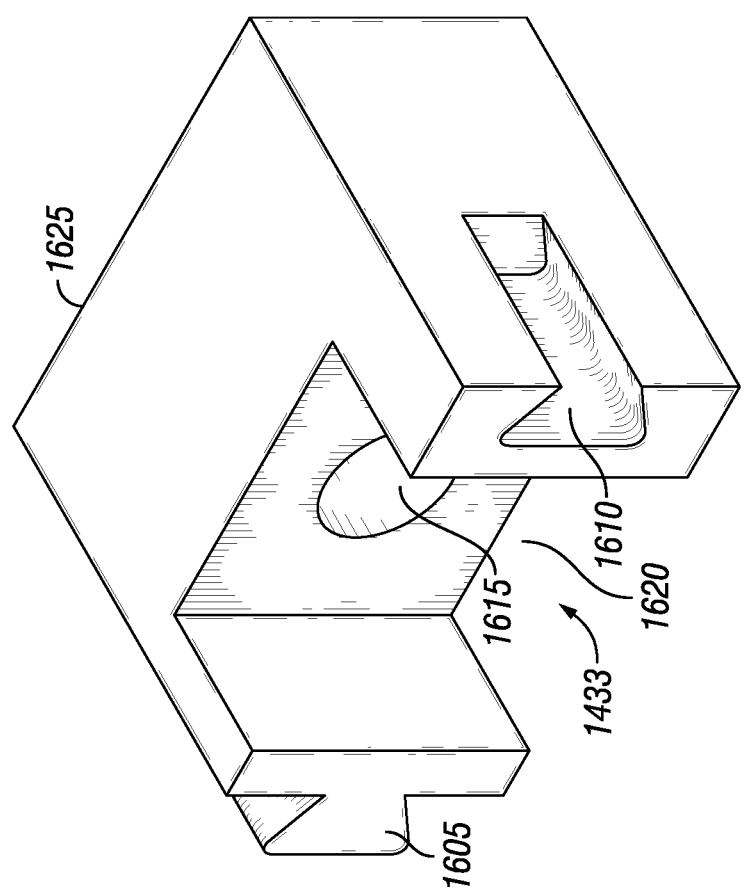
FIG. 16 is an isometric view of a connecting unit of the service line handling system.

In FIG. 16, an isometric view of a connecting unit 1433 is provided. As shown in FIG. 16, the connecting unit 1433 may have a first side 1625 adapted to be adjacent to the opposing connecting unit 1431. As illustrated in FIGS. 14 and 15, side 1625 may be substantially flat, but those skilled in the art will appreciate that other surface shapes may be used. The second side of the unit 1433 has a generally rectangular recess 1620 between a top end and a bottom end. Although "top" and "bottom" are used herein for convenience and consistently with the illustration of unit 1433 in FIGS. 14 and 15, those skilled in the art will recognize the orientation of the unit 1433 may be changed. Still referring to FIG. 16, the unit 1433 has on its top side a projection 1605 and on its bottom side has a recess 1610. In addition, the unit 1433 has a hole or opening 1615 therein, which is adapted to removably receive and hold a portion of one of the bolts 1442 shown in FIG. 14.

Figure 17:
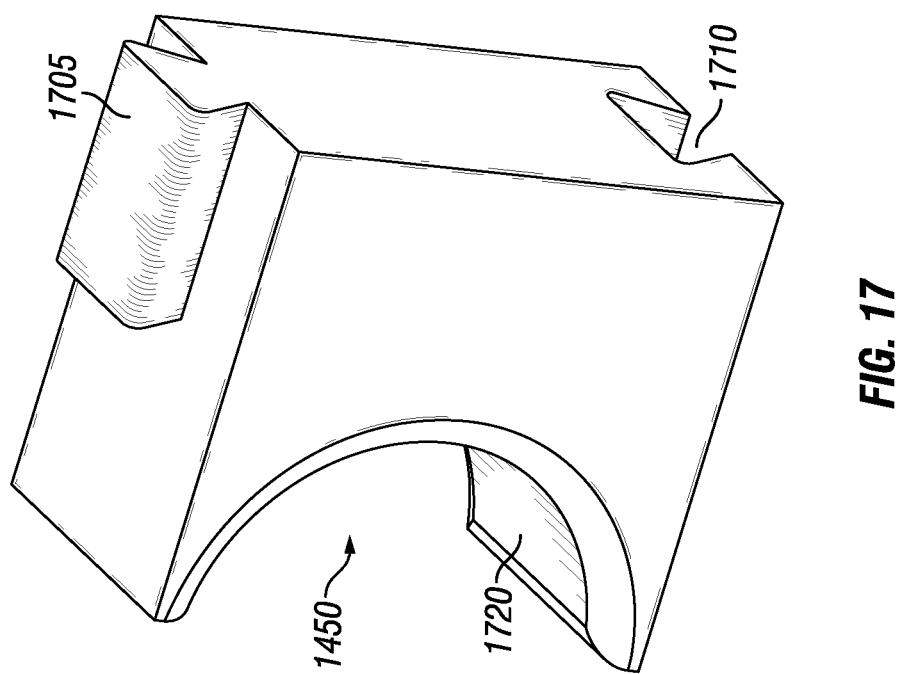
FIG. 17 is an isometric view of a bracket of the service line handling system.

FIG. 17 provides an isometric view of bracket 1450. As shown in FIG. 17, the bracket 1450 has a top, a bottom, and two sides. The side shown on the right is shown as substantially flat. The opposing side, shown on the left in FIG. 17, defines a portion of an opening (such as opening 1455). This opposing side includes an arcuate portion 1720 between the top and bottom of the bracket 1450. The arcuate portion 1720 can define a hemisphere or portion of a circle, or can define an elliptical or other shape. In addition, the arcuate portion 1720 can comprise most of the side (such as shown in FIG. 17), but those skilled in the art will appreciate from the other figures and description that the arcuate potion 1720 can also comprise a relatively small portion of the side of the bracket 1455, such as if the arcuate portion 1720 and its opposing mate are intended to removably hold a wire (as opposed to, e.g., a relatively large pipe).

The bracket 1455 as shown in FIG. 17 further includes a wedge or projection 1705 on a portion of its top, as well as a recess 1710 in a portion of its bottom. It will be appreciated that the projection 1705 can be of the same or substantially the same size and shape as the recess 1710, or that they may differ in shape and size. However, as shown in FIG. 14, each of the brackets 1450, 1460, and the connecting units 1411 and 1413, 1421 and 1423, and 1431 and 1433, respectively, may have recesses on at least a portion of their respective bottom sides and projecting wedges on at least a portion of the respective top sides, with each of the recesses adapted to removably receive and hold one of the projecting wedges. If the sizes and shapes of all the pairs of opposing brackets 1450 and 1460, and the opposing pairs of connecting units 1411, 1413, 1421, 1423, 1431, 1433, are substantially the same, however, it will be appreciated that the various pairs of brackets (which may define openings 1455 of different sizes and shapes) may be assembled into the system in whatever order of openings 1455 may be desired for a particular configuration of the cabling, piping, and other service lines on a boom. This configuration allows for easier use and more flexibility in arranging the various lines to be held by the boom.

Those skilled in the art will appreciate that a variety of materials may be used in connection with the rack or system 1401 as shown and described. For example, the brackets 1410 and 1415 can be made of metals, such as steel, and can be made of other materials such as metal alloys like aluminum, or titanium, composites such as fiber glass or carbon fiber, or even polymeric materials, such as plastics like polyetheretherketone, or combinations thereof, or any other such sufficiently strong and rigid material or combination of materials. The opposing connector units 1411, 1413, 1421, 1423, 1431, and 1433, and/or opposing pairs of brackets 1450 and 1460 may comprise any of the foregoing materials and may also be made of any of the following materials: polymers like thermoplastics, ceramics, metal alloys, elastomers such as natural or synthetic rubbers, or any other such material with suitable desired characteristics, or combinations thereof. It will therefore be appreciated that, in general, it is desirable that the rack or system 1401 comprise relatively rigid materials which are also relatively lightweight materials.

Those skilled in the art will appreciate that the present disclosure illustrates and describes a movable boom system with a great deal of flexibility and ease of use, among other advantages. For example, a first boom may have several holding systems 1401 attached at four or so intervals along the length of the boom, such as if it is desired to avoid any slack in cabling or other flexible service lines to be held by the boom. However, it will be appreciated that the other boom may have fewer or more holding systems 1401 than the other boom, or may have the same number. Although we expect that generally the same order of the service lines from top to bottom (or, alternatively, bottom to top) will likely be the same on the various booms, this need not necessarily be so.

It will be appreciated from the illustrations and description provided that the boom system as disclosed herein provides a number of advantages. One of the advantages of the boom system of the present disclosure is that it can be used to keep the service lines attached tightly to a boom so that there is no slack and resulting droop of the service lines below the bottom of a boom. In addition, another advantage is that the boom system of the present disclosure provides a stable system not susceptible to tipping even when the booms and boom system provide a clearance of from at least four feet, five feet, six feet, or seven feet between the bottom of the boom and the ground level (or the skid level when the ground level varies below a boom).

While the present invention has been shown and described in its preferred embodiment and in certain specific alternative embodiments, those skilled in the art will recognize from the foregoing discussion that various changes, modifications, and variations may be made thereto without departing from the spirit and scope of the invention as set forth in the claims. For example, those skilled in the art will appreciate that the foregoing description and figures generally depict a boom system with a particular configuration, such as a skid with two posts and two-part booms pivotally attached thereto, but other configurations involving less or more posts, booms, and/or boom configurations may be used, and in addition less or more rig booms may be provided. In addition, other means for moving the skid can be provided beyond those shown and described above. For example, a plurality of a continuous band of modular tread plates that are linked together to create an uninterrupted surface for machinery to roll over can be used. Each such track band can be driven by wheels or sprockets and can be made of either steel or synthetic plates. Such tracks both increase traction and decrease the imparted ground bearing pressure when compared to standard wheels. In addition, a plurality of self-driven wheels can be used for moving the skid, such as a plurality of wheels with individually powered electric motor hubs. Such wheels can be adapted to rotate and articulate individually to allow the skid structure to move in any direction or mode as may be desired. Another example of means for moving the skid include the use of an air bearing or air cushion, which can be used to create a cushion of air beneath a structure to lift a substantial load and allow it to easily move when a minimal external force is applied. Such an air cushion decreases friction between the ground surface and the bottom of the supporting structure to near zero. Still another type of means for moving the skid is the use of rollers or skid plates, which allow a structure to be pushed or pulled using an additional piece of equipment. Such rollers or skid plates decrease friction between the ground surface and the structure.

Hence, the embodiment and specific configurations, dimensions, materials and the like are merely illustrative and do not limit the scope of the invention or the claims herein.

What is claimed is:

1. A mobile boom system comprising:
a skid having a first post in a first location and a second post in a second location, wherein the first post has a first bushing with an outside diameter and an inside diameter larger than an outside diameter of the first post, and wherein the first bushing fits on a portion of the first post;
a first boom having a first end and a second end, wherein the first end of the first boom is pivotally attached to the first post, and wherein the first end of the first boom has an opening with an inner diameter larger than the outside diameter of the first bushing, and wherein at least a portion of the first bushing is located within the opening;
a second boom having a first end and a second end, wherein the first end of the second boom is pivotally attached to the second end of the first boom; and
a third boom having a first end and a second end, wherein the first end of the third boom is pivotally attached to the second post, wherein each of the first boom, the second boom, and the third boom are adapted to support at least a portion of a service line.

2. The mobile boom system according to claim 1, further comprising a fourth boom having a first end and second end, wherein the first end of said fourth boom is pivotally attached to the second end of said third boom.

3. The mobile boom system according to claim 1, wherein the service line comprises a wire, a cable, a pipe, a hose, or a combination thereof.

4. The mobile boom system according to claim 1, wherein at least one of the first boom and the second boom are adapted to carry a plurality of service lines at a height of at least five feet above ground level.

5. The mobile boom system according to claim 1, further comprising a power unit located on said skid and a controller connected to actuators adapted to move a plurality of pads or feet coupled to the skid, wherein said controller is also connected to a processor for executing computer software instructions in response to one or more inputs to said controller from an operator.

6. The mobile boom system according to claim 5, wherein said controller is connected to the processor wirelessly or with a tethered cable and said controller can be remotely operated by an operator at a distance of at least twenty-five feet from said skid.

7. The mobile boom system according to claim 1, wherein at least the first or third boom is operable to rotate at least 180 degrees from a first position.

8. The mobile boom system according to claim 1, wherein the maximum angle between said first boom and said second boom is less than 180 degrees.

9. The mobile boom system according to claim 1 further comprising a second bushing, wherein a portion of the first bushing covers at least a portion of the first post and is located at least partially within the opening of the first boom, and a portion the second bushing is located at least partially within the opening of the first boom.

10. The mobile boom system according to claim 9 further comprising a cap attached to a top end of the second post.

11. The mobile boom system according to claim 9 wherein the first post comprises an annular lip and a bottom side of the first bushing abuts the lip.

12. The mobile boom system according to claim 1, wherein the second post comprises a second bushing with an outside diameter and an inside diameter larger than the outside diameter of the first post, and wherein the first bushing is fitted onto the first post, and wherein the first end of the third boom has a second opening with an inner diameter larger than the outside diameter of the second bushing, and wherein at least a portion of the second bushing is located within the opening of the third boom.

13. A mobile boom system comprising:
a skid having a first post located at a first location and a second post located at a second location;
a first boom having a first end and a second end, wherein the first end of the first boom is rotatably attached to the first post;
a second boom having a first end and a second end, wherein the first end of the second boom is pivotally attached to the second end of the first boom;
a third boom having a first end and a second end, wherein the first end of the third boom is rotatably attached to the second post; and
a drag chain attached at a first end to the second boom and attached at a second end to the first boom.

14. The mobile boom system according to claim 13, further comprising means for moving said skid, wherein the means for moving said skid comprise at least one of a plurality of hydraulically actuated pads, a plurality of wheels, a plurality of wheels each having individually powered electric motor hubs, a plurality of linked treads, means for generating an air cushion, and a plurality of rollers or skid plates, where said skid is moved by an external pulling or pushing force exerted by an additional piece of equipment.

15. The mobile boom system according to claim 14, wherein said means for moving said skid further comprises a controller operable by an operator to selectively actuate said means for moving said skid.

16. The mobile boom system according to claim 13 further comprising a plurality of service lines attached to at least one of the first boom, the second boom, and the third boom.

17. The mobile boom system according to claim 13 wherein the drag chain further comprises a plurality of segmented units.

18. The mobile boom system according to claim 13 wherein the drag chain restricts the potential amount of rotation of the first boom and the second boom relative to one another.

19. The mobile boom system according to claim 18 wherein the drag chain restricts the potential amount of rotation of the first boom and the second boom relative to one another to less than 180 degrees.

20. The mobile boom system according to claim 13 wherein a plurality of service lines are attached to the drag chain.

21. The mobile boom system according to claim 20 wherein at least one service line is attached to an interior surface of the drag chain.

22. A mobile boom system comprising:
a skid having a first post located at a first location and a second post located at a second location;
a first boom having a first end and a second end, wherein the first end of the first boom is rotatably attached to the first post;

a second boom having a first end and a second end, wherein the first end of the second boom is pivotally attached to the second end of the first boom;

a third boom having a first end and a second end, wherein the first end of the third boom is rotatably attached to the second post;

a fourth boom having a first end and a second end, wherein the first end of the fourth boom is pivotally attached to the second end of the third boom;

a first drag chain attached at a first end to the second boom and attached at a second end to the first boom; and a second drag chain attached at a second end to the third boom and attached at a first end to the fourth boom.

23. The mobile boom system according to claim 22 wherein the first drag chain and the second drag chain have different lengths.

24. The mobile boom system according the claim 23 wherein the first drag chain and the second drag chain comprise a plurality of segmented units.

25. The mobile boom system according to claim 22 wherein each of the first boom, the second boom, the third boom, the fourth boom, the first drag chain, and the second drag chain are adapted to support a plurality of service lines.

* * * * *